United States Patent [19]
Cushman et al.

[11] Patent Number: 5,751,698
[45] Date of Patent: May 12, 1998

[54] SYSTEM AND METHOD FOR AUTOMATICALLY IDENTIFYING AND ANALYZING ACTIVE CHANNELS IN AN ATM NETWORK

[75] Inventors: Paul W. Cushman, Montclair, N.J.; King L. Won, San Jose, Calif.; Bakulesh A. Mehta, Sunnyvale, Calif.; Mark Akselrod, San Ramon, Calif.

[73] Assignee: Network General Technology Corporation, Menlo Park, Calif.

[21] Appl. No.: 616,465

[22] Filed: Mar. 15, 1996

[51] Int. Cl.$^6$ .................................................... H04J 1/16
[52] U.S. Cl. ............................................. 370/252; 370/397
[58] Field of Search ................................... 370/241, 244,
370/247, 248, 250, 251, 252, 254, 354,
389, 396, 474, 397, 245, 258, 349, 350,
384, 385, 399, 409, 431, 432, 433, 464,
465, 466, 467, 469, 471, 395

[56] References Cited

U.S. PATENT DOCUMENTS 5,544,161   8/1996   Bigham et al. .......................... 370/397
5,583,864  12/1996   Lightfoot et al. ....................... 370/396

Primary Examiner—Dang Ton
Attorney, Agent, or Firm—Fenwick & West LLP

[57] ABSTRACT

A system and method for identifying and analyzing active channels in an asynchronous transfer mode (ATM) network. The system and method monitor an ATM network signal channel to identify setup, connect, and release messages which permit identification of active switched virtual circuits and the service type used for that active virtual circuit's traffic. The system and method also possess the simultaneous ability to open a plurality of ATM network channels during a time period; to automatically monitor each of the plurality of open channels to identify any active channels from among the open channels; and to automatically identify the type of traffic transmitted on the open channels. By systematically identifying the active channels in the ATM network, the ATM network analysis device can further analyze the traffic on the active channels. The present invention includes at least four functions: network data detection and capture, active channel determination, signaling message analysis, and ATM Application Layer (AAL) service type categorization. A network data detector and identifier (DDI) performs the functions of network data detection and capture. The DDI captures, copies, and repeats cells transmitted on the network and copies cells of interest to the DDI for further analysis. Active channel determination is performed by an active channel determinator (ACD). The ACD uses a user-defined total potential connection list which contains a range of channels to be tested for active channel identification. To identify active channels, the ACD opens a subset (block) of the channels in the total potential connection list, and in conjunction with the DDI, determines if any cells captured by the DDI correspond to any of the open channels in the block. If such cells are received, the ACD identifies the channel associated with the received cells as an active channel. After a time period, the ACD closes the open subset of channels, opens a new block of channels for the potential connection list and the process repeats until terminated.

59 Claims, 14 Drawing Sheets

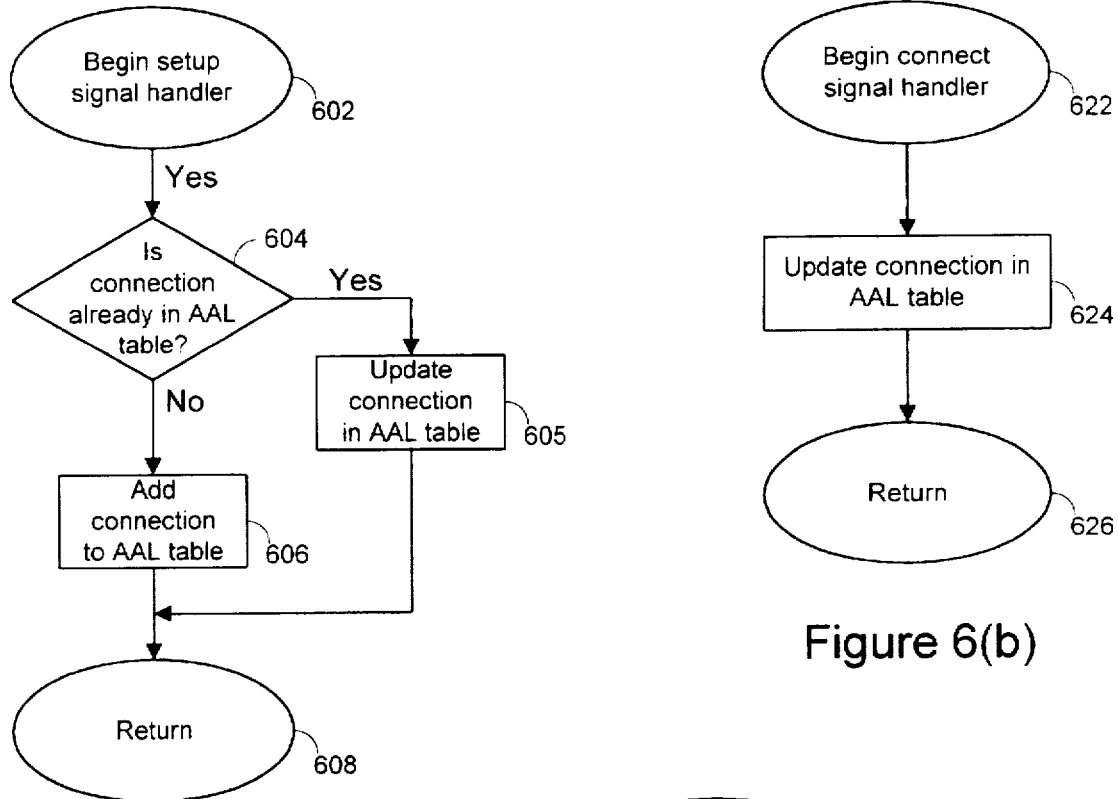
Figure 6(a)
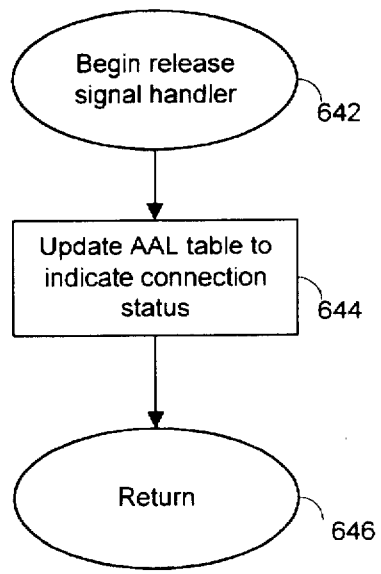
Figure 6(b)
Figure 6(c)

AAL 1 SAR PDU

AAL 3/4 SAR PDU

AAL 5 SAR PDU

ACTIVE CHANNEL DETECTION

| Time     | $t_{-1}$ | $t_0$ | $t_1$ | $t_2$ | $t_3$ | $t_4$ | $t_5$ | $t_6$ | $t_7$ | $t_8$ |
|----------|----------|-------|-------|-------|-------|-------|-------|-------|-------|-------|
| VP/VC: 0/34  |  | cells | cells | cells |  |  |  |  |  | cells |
| VP/VC: 0/56  |  | cells | cells |  | cells |  |  |  |  |  |
| VP/VC: 0/255 |  | cells |  | cells |  | cells |  | cells |  | cells |

Figure 14

| Time | $t_{-1}$ | $t_0$ | $t_1$ | $t_2$ | $t_3$ | $t_4$ | $t_5$ | $t_6$ | $t_7$ | $t_8$ | $t_9$ |
|---|---|---|---|---|---|---|---|---|---|---|---|
| Signal Detection | | | | | | | | | | | |
| Setup.msg.CRN=5 | | msg | | | | | | | | | |
| Conn.msg.CRN=5 | | | msg | | | | | | | | |
| Release.msg.CRN=5 | | | | msg | | | | | | | |
| Setup.msg.CRN=7 | | | | | msg | | | | | | |
| Setup.msg.CRN=7 | | | | | | msg | | | | | |
| Conn.msg.CRN=9 | | | | | | | msg | | | | |
| Setup.msg.CRN=5 | | | | | | | | msg | | | |
| Setup.msg.CRN=10 | | | | | | | | | msg | | |
| Conn.msg.CRN=10 | | | | | | | | | | msg | |

Figure 15

SYSTEM AND METHOD FOR AUTOMATICALLY IDENTIFYING AND ANALYZING ACTIVE CHANNELS IN AN ATM NETWORK

CROSS-REFERENCES TO RELATED APPLICATIONS

The subject matter of this application is related to the subject matter of application Ser. No. 08/616,603, entitled "SYSTEM AND METHOD FOR AUTOMATICALLY IDENTIFYING AND ANALYZING CURRENTLY ACTIVE CHANNELS IN AN ATM NETWORK", filed on 15 Mar. 1996, by Paul W. Cushman, King L. Won, and Bakulesh A. Mehta, which is incorporated by reference herein in its entirety.

BACKGROUND OF THE INVENTION

1. Field of the Invention

This invention relates generally to the field of ATM network analysis. More particularly, this invention relates to the field of automatic connection identification and analysis in an ATM network.

2. Description of Background Art

In recent years, there has been a sharp increase in the demand for network bandwidth which has been principally driven by two trends: (i) the increasing number of networked computers exchanging data; and (ii) the increasing need for networked computers to exchange ever-increasing quantities of data. In response to this demand, a variety of new computer network technologies have been developed that improve upon existing technologies by increasing the efficiency of data transmission, increasing the speed of data transmission, or both. One network technology incorporating both improvements is the asynchronous transfer mode (ATM) network. Although these new technologies achieve increased network bandwidth, they also create a need for new and improved technologies to analyze networks incorporating these technologies.

The prevailing network topology of earlier generations of networks, such as Ethernet, Token Ring, and fiber distributed data interface (FDDI), is one of a shared physical link. All of such network's end stations are attached to the same network segment or link and share a single physical link having a fixed bandwidth. Such networks are referred to as broadcast networks since the data transmitted from a single station may be received by all other stations on that link. One disadvantage of broadcast networks is that the addition of more end stations onto the link reduces the average bandwidth available to each station on that link. However, analyzing network traffic on a broadcast network is relatively straightforward since the single shared bandwidth link may be monitored at any point to receive all traffic that flows through that link.

As the demand for network bandwidth increased, new solutions were developed to overcome the shortcomings of shared bandwidth. One technology developed to improve network efficiency is commonly known in the art as switched networking or microsegmentation. Switched networks improve network bandwidth by establishing a dedicated link between an end station and a port on a network switch. The network switch routes all traffic in such a network by directing the traffic only to the stations that are the traffic's destination. In doing so, no broadcasting occurs as in the shared link approach and the link's full bandwidth is always available whenever the switch or end station seeks to transmit. Although switching improves a network's efficiency, the inability for all end stations to listen to the traffic sent to other stations in the same segment makes the task of analyzing, i.e., monitoring, network traffic more difficult since one must develop a method to monitor the traffic on multiple links simultaneously.

Additional improvements were made to switched networks to further improve bandwidth. ATM networks improve upon the switched network model by introducing virtual circuits and intelligent switching. Virtual circuit bandwidth allocation and transfer characteristics, such as delays and delay variations, can be tailored to the application traffic's needs. End stations can now request, through intelligence in the switches and signaling protocols, that the network provide the necessary bandwidth and quality of services needed on each virtual circuit. Primarily as a result of those improvements, ATM networks can simultaneously transport multiple types of network traffic, such as voice, data, and video, on a single physical link using different service types based upon the requirements of the traffic. However, analysis of the traffic on an ATM network is difficult because each such service type utilizes a different data container.

The improvements of virtual circuits permit increased bandwidth utilization in an ATM network. However this increased bandwidth utilization also increases the complexity of the ATM network. A single physical link is subdivided into virtual paths (VP), which are further subdivided into virtual channels (VC). Currently, typical ATM networks permit subdivision of a physical link into a maximum of approximately four thousand VP's, and the VP's may be further subdivided into a maximum of approximately sixty-four thousand VC's. Thus, there are potentially in excess of 256 million ($2^{28}$) assignable virtual circuits within each dedicated link. Despite the large number of potential virtual circuits, frequently, the number of ATM virtual circuits (VP/VC pairs, channels) that are of interest to the user of a network analysis device is significantly less than the total number of potential ATM channels.

Each virtual circuit may be identified by its associated VP/VC pair. For example, if the VP is 3 and the VC is 42, the channel can be denoted as 3/42. With the exception of special use channels, for example, the first thirty-two VC's associated with VP 0 (which are reserved for specific functions, such as 0/5 for signaling and 0/16 for interim local management interface), most of the other ATM network channels may potentially be an active virtual channel.

Prior to the widespread availability of signaling capability in ATM systems, all channel assignments were accomplished by the use of permanent virtual circuits (PVCs). PVC's are configured on a channel-by-channel basis by a manual assignment process occurring at both the ATM switch console and ATM end stations. Typically, such PVC's are left unchanged, i.e., permanently setup, until the channel is no longer needed. Additional ATM network technology improvements now permit the end stations themselves to transmit a signal request to the appropriate network device to request that a virtual circuit be set-up, connected, or released as needed. Such virtual circuits are known as switched virtual circuits (SVCs). In a network supporting SVC's, the virtual circuit setup and release requests are transmitted in a signaling channel, typically assigned to channel 0/5.

The analysis of ATM network traffic is made difficult by the large number of potentially active virtual circuits and the ability for virtual circuits to be created and disconnected in a manner which is transparent to a user. Currently, in order to analyze an ATM network, an ATM network device, must already know the active channels. There is a need for a method and system to connect a network analysis device to an already active ATM network and: (i) automatically identify all active ATM network channels, even those active channels established prior to the connection of the ATM network analysis device to the ATM network; (ii) automatically track status changes to the active channels; and (iii) identify the quality of service utilized by the active channels.

In addition to the implementation of virtual circuits, ATM networks also typically operate over a wider and higher range of speed than other network topologies, with the common current rates of data transfer on ATM networks being 155 Mbps and 622 Mbps. Typical network analysis devices capture all network traffic in high speed capture buffers. However, due to the increased data flow of an ATM network, typical implementations of high speed capture buffers for an ATM network analysis device may be insufficient. Unless the buffers are very large, high speed data capture buffers will overflow and network data may be lost. To reduce the necessary size of the capture buffers and to reduce the need for new processors or processing approaches to analyze the high speed ATM network traffic, a filtering technique is needed to efficiently select network data that should be further analyzed.

What is needed is a system and method for connecting a network analysis device to an ATM network to: (i) automatically identify all active ATM network channels, even those active channels established prior to the connection of the ATM network analysis device to the ATM network; (ii) automatically track status changes to the active channels; (iii) identify the service parameters utilized by the active channels; and (iv) filter the detected data and to capture and store only the data of interest, e.g., only data sent from a particular station.

SUMMARY OF THE INVENTION

The invention is a system and method for identifying and analyzing active channels in an asynchronous transfer mode (ATM) network. The system and method monitor an ATM network signal channel to identify setup, connect, and release messages which permit identification of active switched virtual circuits and the service type used for that active virtual circuit's traffic. The system and method also possess the simultaneous ability to open a plurality of ATM network channels during a time period; to automatically monitor each of the plurality of open channels to identify any active channels from among the open channels; and to automatically identify the type of traffic transmitted on the open channels. By systematically identifying the active channels in the ATM network, the ATM network analysis device can further analyze the traffic on the active channels.

The present invention includes four functions: network data detection and capture, active channel determination, signaling message analysis, and ATM Application Layer (AAL) service type categorization. A network data detector and identifier (DDI) performs the functions of network data detection and capture. The DDI is comprised of both hardware and software including a physical-layer POD (P-pod) and an interface card in a computer. The DDI connects to an ATM network and captures, copies, and repeats cells transmitted on the network and copies cells of interest to the DDI for further analysis.

Signaling message analysis is performed by a signaling engine connected to the DDI. The DDI works with a Segmentation and Reassembly (SAR) Driver which notifies the signaling engine if it receives a frame on a signaling channel. When the signaling engine receives this notification, it analyzes the frame to determine if the frame includes a signaling message. If the frame includes a signaling message, the signaling engine determines the signaling message type (e.g., setup, connect, or release) and the affected channel. Depending upon the signaling message type and the signaling messages previously received by the signaling engine, the signaling engine updates the channel information which may be accessed and used by the ATM network analysis device.

Active channel determination is performed by an active channel determinator (ACD) which is connected to the DDI. The ACD uses a user-defined total potential connection list which contains a range of channels to be tested for active channel identification. To identify active channels, the ACD opens a subset (block) of the channels in the total potential connection list, and in conjunction with the DDI, determines if any cells captured by the DDI correspond to any of the open channels in the block. If such cells are received, the ACD identifies the channel associated with the received cells as an active channel. After a time period, the ACD closes the open subset of channels, opens a new block of channels for the potential connection list and the process repeats until terminated AAL service type categorization is performed by an AAL Type Determinator which works in conjunction with the DDI. The AAL Type Determinator analyzes data cells received on an active channel to try to determine the AAL service type utilized on that active channel.

BRIEF DESCRIPTION OF THE DRAWINGS

FIG. 6(a) is a flow chart illustrating the setup signal handling process according to a preferred embodiment of the present invention.

FIG. 6(b) is a flow chart illustrating the connect signal handling process according to a preferred embodiment of the present invention.

FIG. 6(c) is a flow chart illustrating the release signal handling process according to a preferred embodiment of the present invention.

FIG. 14 is an example of the active channel detection process according to a preferred embodiment of the present invention.

FIG. 15 is an example of the signal detection process according to a preferred embodiment of the present invention.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit(s) of each reference number correspond(s) to the figure in which the reference number is first used.

Figure 1A:
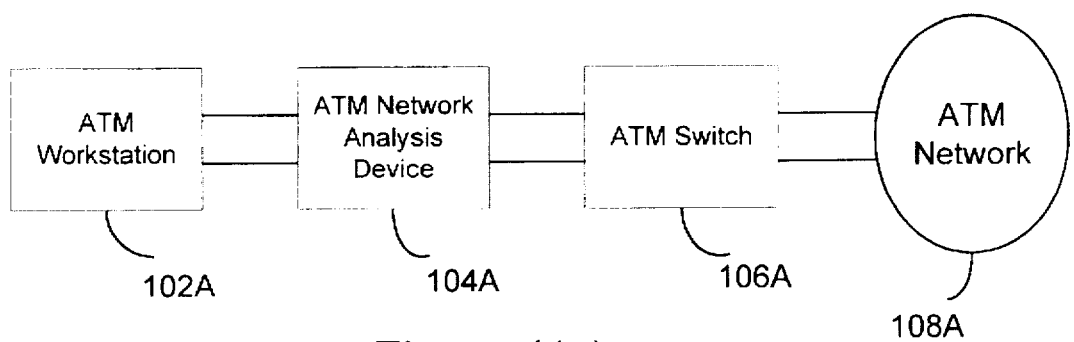
FIG. 1(a) is an illustration an ATM network having an ATM network analyzer positioned between an ATM workstation and an ATM switch according to a first embodiment of the present invention.

FIG. 1(a) illustrates an ATM network 108A having an ATM network analysis device 104A positioned between an ATM workstation 102A and an ATM switch 106A according to a first embodiment of the present invention. In this embodiment, cells transmitted between the ATM switch 106A and the ATM workstation 102A are captured and copied by the ATM network analysis device 104A, and are then repeated along the network to their intended destination. The technique for cell capture, copy, and repeating of ATM cells is described below with reference to FIGS. 2 through 15. The ATM network analysis device 104A connects to the ATM network 108A at the user-network interface (UNI). Accordingly, the cells captured, copied, and repeated by the ATM network analysis device 104A are formatted in accordance with a UNI specification. A more detailed discussion of ATM networks and a UNI is set forth in Goralski, *Introduction to ATM Networking* (1995), and McDysan and Spohn, *ATM: Theory and Application* (1995), which are both incorporated herein in their entirety.

Figure 1B:
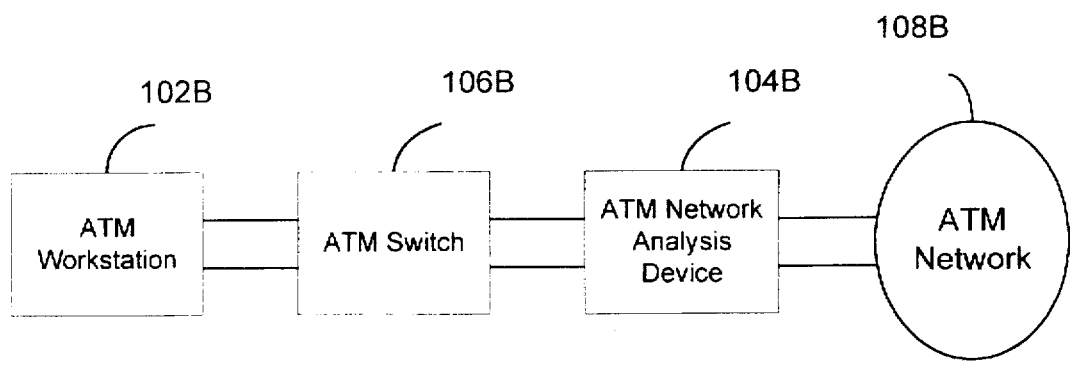
FIG. 1(b) is an illustration an ATM network having an ATM network analysis device positioned between an ATM switch and the remaining elements of the ATM network according to a second embodiment of the present invention.

FIG. 1(b) is an illustration of an ATM network having an ATM network analyzer positioned between an ATM switch 106B and the remaining elements of the ATM network 108B according to a second embodiment of the present invention. In this embodiment, cells transmitted between the ATM switch 106B and the ATM network 108B are captured and copied by the ATM network analysis device 104B, and then repeated along the network to their intended destination. The technique for capture, copy, and repeating of ATM cells is described below with reference to FIGS. 2 through 15. The ATM network analysis device 104B connects to the ATM network 108B at the network-node interface (NNI). Accordingly, the cells captured, copied and passed by the ATM network analysis device 104B is formatted in accordance with an NNI specification.

The ATM network analysis device 104 of the present invention can be positioned at either the UNI or the NNI. At either of these interfaces, the elements and the functions performed by the ATM network analysis device 104 are substantially the same and any such distinctions between the two configurations would be apparent to persons skilled in the art. FIGS. 2 through 15 will be described in accordance with the ATM network illustrated in FIG. 1A.

Figure 2:
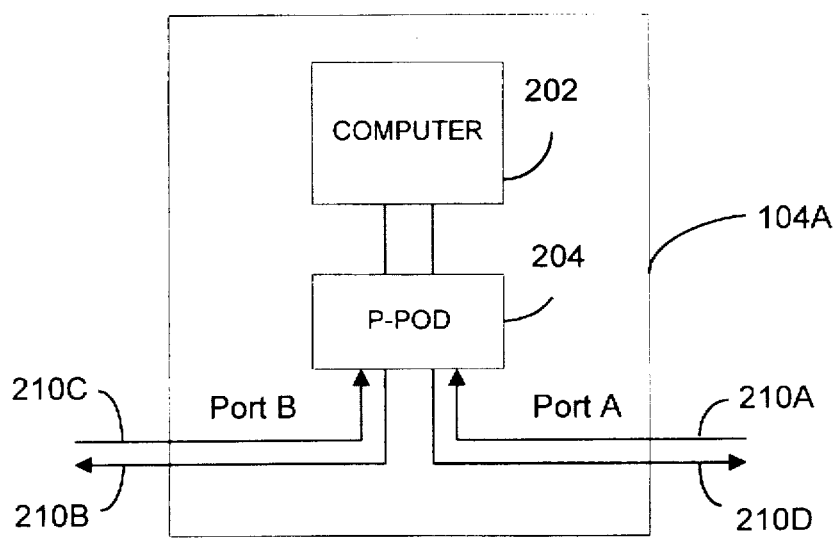
FIG. 2 is a more detailed illustration of the ATM network analysis device according to a preferred embodiment of the present invention.

FIG. 2 is a more detailed illustration of the ATM network analysis device 104A according to a preferred embodiment of the present invention. The ATM network analysis device 104A includes a physical layer pod 204 (P-pod) having two ports, port A and port B. Each port of the P-pod permits bi-directional cell transmission. In FIG. 2, port A is coupled to the ATM switch 106A and port B is coupled to the ATM workstation 102A. The P-pod 204 is also coupled to a computer 202. The computer 202 and the P-pod 204 are described in greater detail below with reference to FIGS. 3-13.

Figure 3:
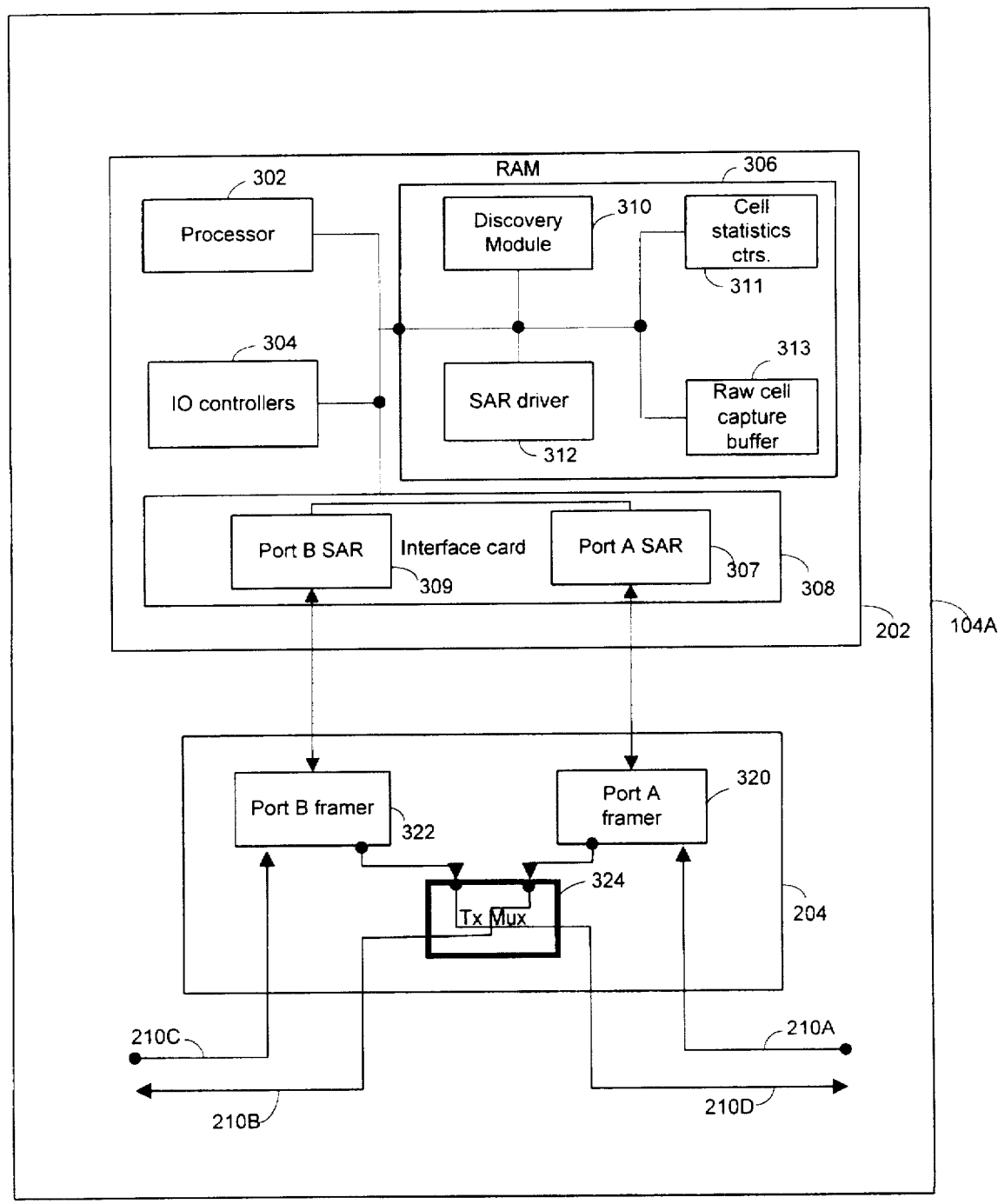
FIG. 3 is a more detailed illustration of a P-POD and a computer of the ATM network analysis device according to a preferred embodiment of the present invention.

FIG. 3 is a more detailed illustration of the P-pod 204 and a computer 202 of the ATM network analyzer 104A according to a preferred embodiment of the present invention. The P-pod 204 includes two framers 320, 322 and a multiplexer (MUX) 324. In a preferred embodiment, the P-pod 204 is an OC-3c Multi-Mode Fiber Pod commercially available from Network General Corporation, Menlo Park, Calif. The P-pod 204 is an ATM compliant pod and connects an interface card 308 to the network. The computer 202 may be an IBM-compatible personal computer, which includes a processor 302, e.g., a Pentium microprocessor commercially available from Intel Corporation, Santa Clara, Calif., a conventional controller 304, an interface card 308, and random access memory (RAM) 306. The RAM 306 contains a discovery module 310, a cell statistics counter 311, a segmentation and reassembly (SAR) driver 312, and a raw cell capture buffer 313.

In a preferred embodiment of the present invention, the interface card 308 includes interface logic, such as PCI interface logic, and two SAR engines 307, 309 which may be initialized by the SAR driver 312. The functions performed by the interface card 308 include interfacing to the computer's 202 PCI system bus for data transfer between the P-pod 204 and the RAM 306, segmentation of data frames into ATM cells and reassembly of ATM cells into data frames. The interface card 308 is a Zeitnet ATM SAR interface card for PCI bus and is available from Network General Corporation, Menlo Park, Calif.

The P-pod 204 physically connects the ATM network analysis device 104A to the ATM network 108A. Full duplex cables 210, such as fiber optic cables, are used to connect the P-pod 204 to the ATM switch 106A and ATM workstation 102A. ATM cells are received by port A of the P-pod 204 from the ATM switch 106A via cable 210A. An incoming cell from the ATM switch is copied into the port A framer 320, after which the cell is passed to the MUX 324 where it is repeated to the ATM workstation 102A via cable 210B. Similarly, ATM cells are received by port B of the P-pod 204 from the ATM workstation 102A via cable 210C. An incoming cell from the ATM workstation 102A is copied into the port B framer 322, after which the cell is passed to the MUX 324 where it is repeated to the ATM switch 106A via cable 210D. The operation of the P-pod 204 and the computer 202 are described in greater detail below with reference to FIGS. 4 through 15. The SAR driver 312 initializes the interface card 308 to copy cells received by the P-pod from certain open connections into the raw cell capture buffer 313. The technique for analyzing and filtering the received cells is set forth below with reference to FIGS. 4 through 15.

Figure 4:
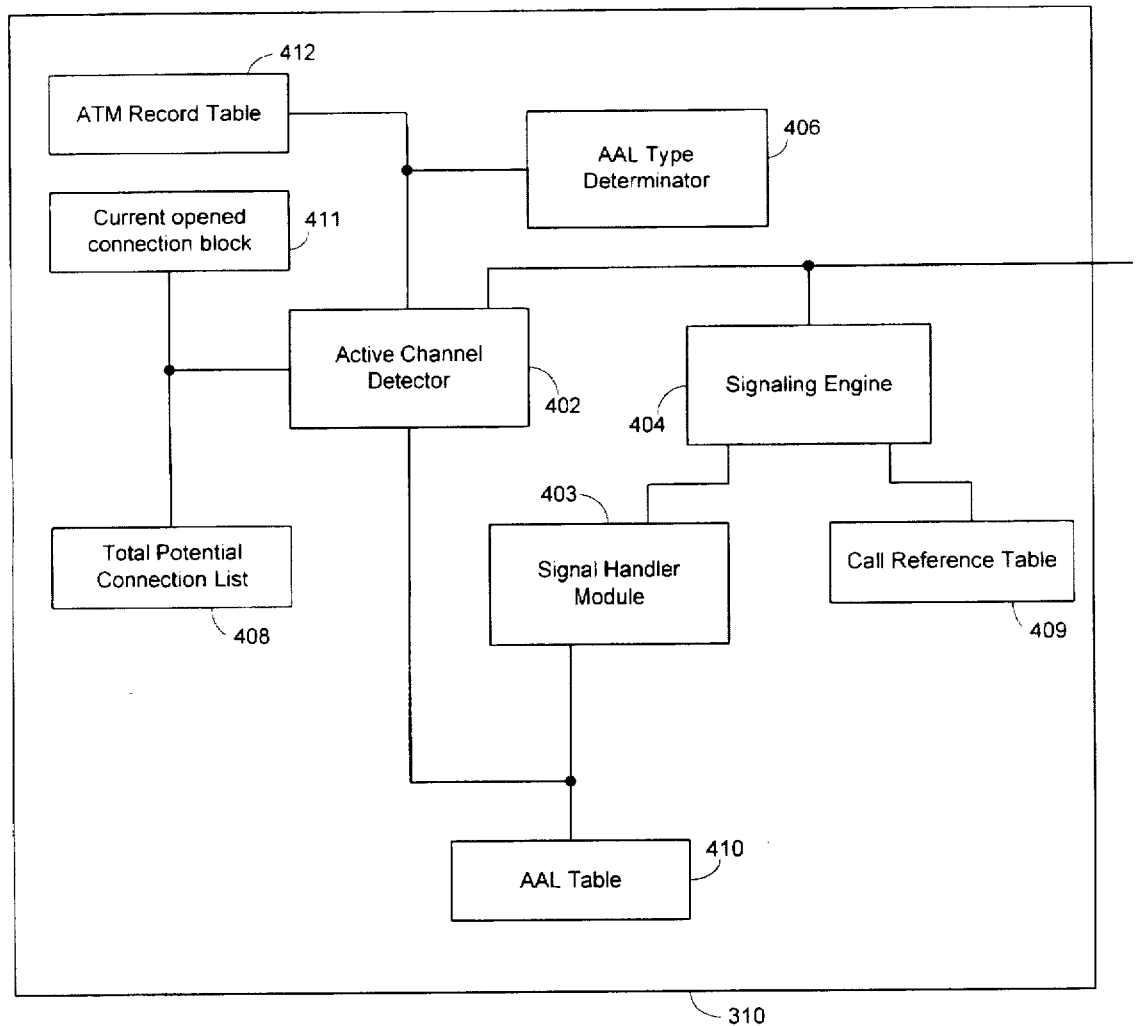
FIG. 4 is a more detailed illustration of the discovery module of the ATM network analysis device according to a preferred embodiment of the present invention.

FIG. 4 is a more detailed illustration of the discovery module 310 of the ATM network analysis device according to a preferred embodiment of the present invention. The discovery module 310 is a software module that includes an active channel detector (ACD) 402, a signal handler module 403, a signaling engine 404, an AAL Type determinator 406, a total potential connection list 408, a call reference table (CRT) 409, an ATM application layer (AAL) table 410, a current opened connection block table 411, and an ATM record table 412. The functions performed by each of these elements are set forth below with reference to FIGS. 5 through 15.

Figure 5:
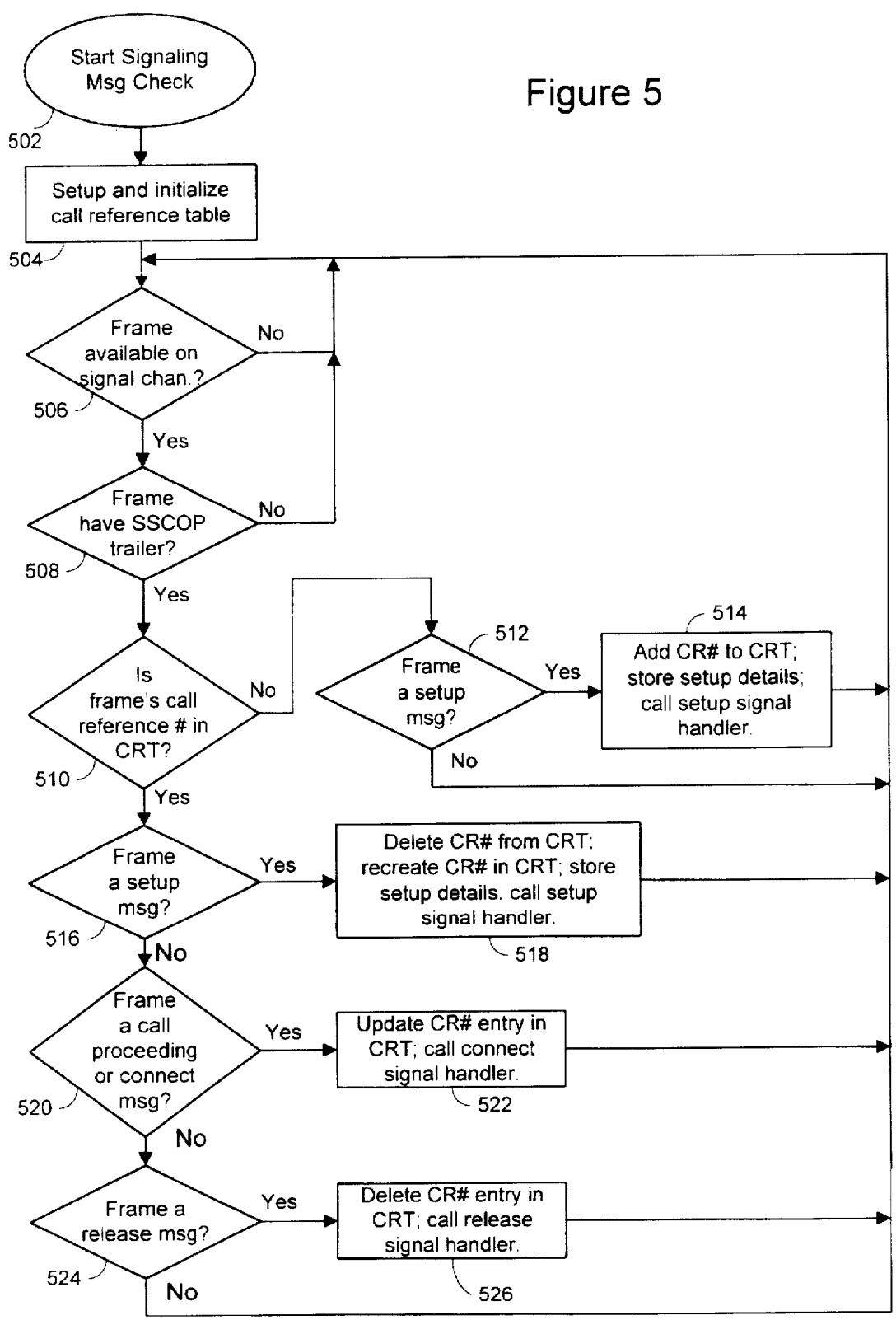
FIG. 5 is a flow chart illustrating the method of analyzing a signal according to a preferred embodiment of the present invention.
Figure 7:
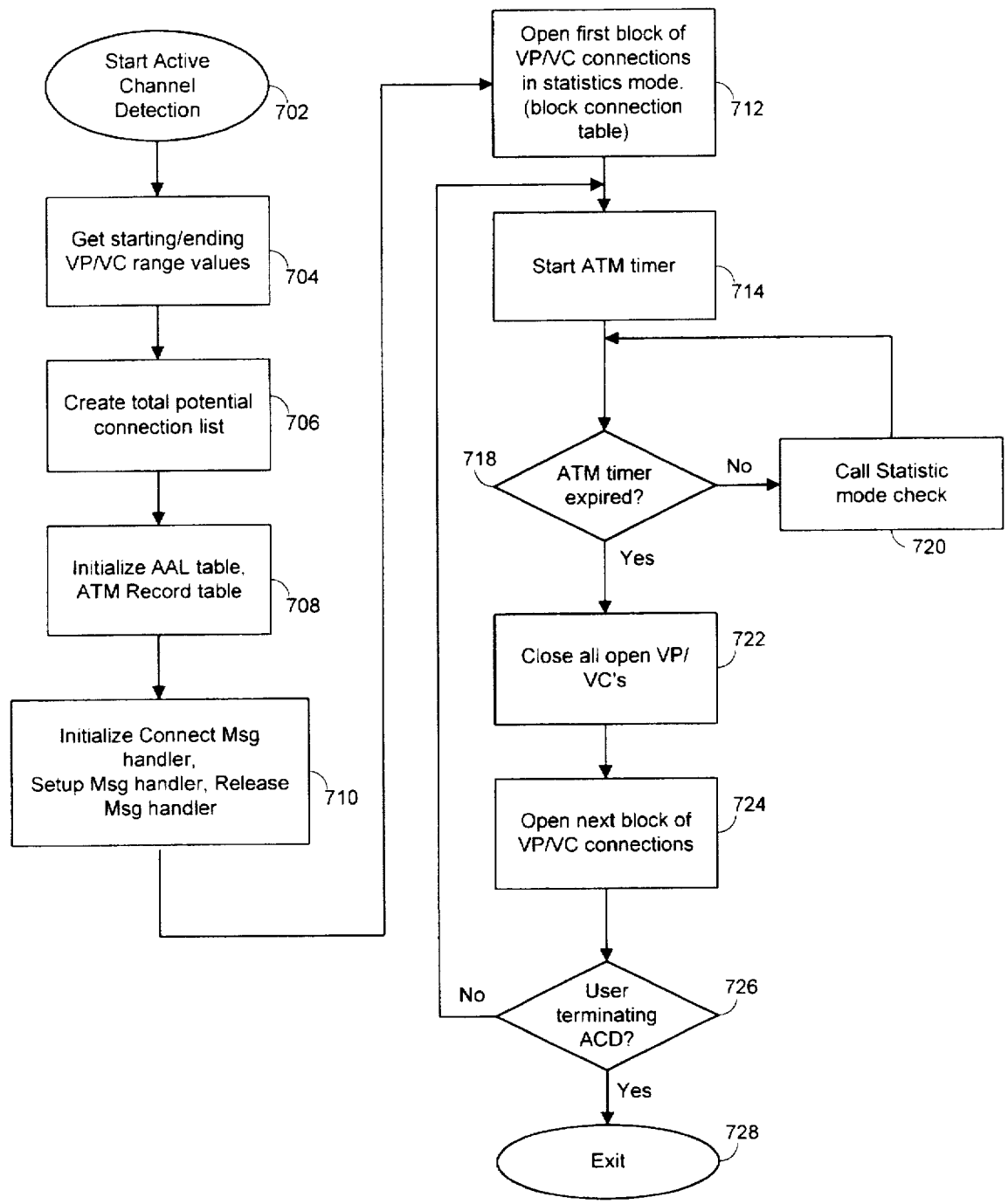
FIGS. 7, 8 and 9 are flow charts illustrating the method of detecting active channels in an ATM network according to a preferred embodiment of the present invention.

FIG. 5 is a flow chart illustrating the method of detecting active channels on an ATM network 100 based upon ATM signaling messages according to a preferred embodiment of the present invention. In a preferred embodiment, the signal message check mode 502 operates continuously as soon as the network analysis device 104A begins its operation.

In the signal message check mode 502 the signaling engine 404 sets up and initializes 504 a CRT 409. The CRT 409 includes information concerning each channel for which the signaling engine 404 receives an appropriate setup message, including a call reference number, i.e., a reference number assigned to related requests for ATM network services on a single channel, channel status, and additional ATM network channel setup information, such as the AAL type of service requested for the channel, i.e., the AAL service type. The SAR driver notifies the signaling engine 404 when it receives a frame on the signaling channel which is typically 0/5. When the signaling engine 404 receives 506 a frame, it determines 508 whether the frame includes a signaling message. In a preferred embodiment of the present invention, the signaling engine 404 determines 508 that the frame received on a signaling channel is a signaling frame if the frame contains a service-specific connection oriented protocol (SSCOP) trailer. If the frame does not have signaling frame characteristics, the signaling engine 404 waits 506 until the SAR driver 312 notifies the signaling engine 404 that it has received another frame on the signaling channel.

If the signaling engine 404 receives a 508 frame with an SSCOP trailer on the signaling channel, i.e., the frame is a signaling message, the signaling engine 404 checks 510 the CRT to determine whether the signaling engine 404 has previously received a signaling message with the same call reference number. If the signaling engine 404 has not received a signaling message with the same call reference number, the signaling engine 404 determines 512 whether the signaling message is a setup message by comparing a portion of the signaling message with a predetermined setup message identifier, as defined by an appropriate protocol. If they match, the signaling message is a setup message and the signaling engine 404 stores 514 information from the setup message in the CRT 409, including the call reference number and the setup information. The signaling engine 404 also calls the setup signal handler mode, which is described below with reference to FIG. 6(a). If the signaling engine 404 determines 512 that the signaling message is not a setup message, then the signaling engine 404 does not modify the CRT and waits 506 until the SAR driver 312 notifies the signaling engine 404 that it has received another frame on the signaling channel.

If the signaling engine 404 receives a signaling message with a previously received call reference number, the signaling engine 404 determines 516 if the signaling frame is a channel setup message. If it is, the signaling engine 404 replaces the old setup information in the CRT corresponding to the call reference number, with the new setup message information and then calls the setup signal handler 602. The setup signal handler 602 is described below with reference to FIG. 6(a). By utilizing this method, the signaling engine 404 only maintains channel status information concerning those channels in which the signaling engine 404 receives appropriate channel setup information.

If the signaling engine 404 receives a signaling message with a call reference number contained in the CRT 409, (i.e., a setup message was previously received), the signaling engine 404 determines 520 if the signaling message is a connect message by comparing a portion of the signaling message with a predetermined setup message identifier. If they match, the signaling message is a connect message. If they do not match, the signaling engine determines 524 if the signaling message is a release message. If the signaling message is a connect message, the signaling engine updates 522 the information in the CRT 409 associated with the call reference number and calls 522 the connect signal handler 622. The connect signal handler is described below with respect to FIG. 6(b). If the signaling engine 404 determines 520 that the signaling message is not a connect message, the signaling engine 404 determines 524 whether the signaling message is a release message by comparing a portion of the signaling message with a predetermined release message identifier as defined by an appropriate protocol. If they match, the signaling message is a release message, the signaling engine 404 deletes 526 the call reference number from the CRT 409 and calls 526 the release signal handler 642. The operation of the release signal handler 624 is described more fully with respect to FIG. 6(c).

FIGS. 6(a), (b) and (c) are flow charts illustrating the method of the signal handlers when setup, connect, and release signaling messages are received, according to a preferred embodiment of the present invention. The signal handlers update information in the AAL table 410 for use by the ACD 402. The AAL table 410 stores information concerning the status of each switched virtual circuit (SVC) for which the signaling engine 404 receives an appropriate setup message. The SVC records in the AAL table identify the channels that are setup, connected, or released during an ATM testing period, i.e., the automatic or user-defined period during which the ATM cells and signals are captured and analyzed by the ATM network analysis device 104. FIG. 6(a) illustrates the method of the setup signal handler according to a preferred embodiment of the present invention. The setup signal handler 602 determines 604 whether there is an entry in the AAL table 410 for the channel corresponding to the setup signaling message. The setup signal handler then either creates 606 an entry in the AAL table 410 or updates 605 the channel entry in the AAL table 410 with the information from the CRT 409 and returns 608 to the signal message check mode.

FIG. 6(b) illustrates the connect signal handler 622 according to a preferred embodiment of the present invention. The connect signal handler method 622 updates 624 the connect information in the AAL table 410 using the information from the CRT 409, and then returns 626 to the signal message check mode.

FIG. 6(c) illustrates the release signal handler 642 according to a preferred embodiment of the present invention. The release signal handler 642 updates 644 the release signaling message information in the AAL table 410 using the information in the CRT 409, and then returns 646 to the signal message check mode.

FIGS. 7 through 13 illustrate the method of detecting active channels and service types without the use of signaling messages according to a preferred embodiment of the present invention. As noted above, frequently, the number of ATM channels (VP/VC pairs) that are of interest to the user of a network analysis device 104 is significantly less than the total number of potential ATM channels. Accordingly, the present invention permits a user of the network analysis device to identify 704 a range of ATM channels to be tested for active status. ATM network traffic that does not occur on one of the channels in the defined range (including special use channels) is ignored. The discovery module 310 uses the user selected range of channels to create 706 a total potential connection list 408 for use by the ACD 402. The total potential connection list 408 includes a data structure that is capable of storing information relating to each potential ATM channel to be checked in the defined range. The ACD also initializes 708, 710 the AAL table, the ATM record table 412 and the signaling message handlers 403. The ATM record table 412 contains information concerning each channel determined to be active during the active channel detection process 702, including both PVCs and SVCs.

As the number of channels in the total potential connection list 408 increases, the memory required to store the channel information similarly increases. In order to limit the amount of memory needed to analyze all of the channels contained in the potential connection list simultaneously, the present invention provides a feature that divides the total potential connection list 408 into connection blocks, each of which is checked sequentially until the active channel detection mode terminates either in response to a user instruction or automatically. The size of the connection block is dependent upon the available memory in the computer 202. In a preferred embodiment, each connection block to be opened contains fifty channels from the total potential connection list 408.

The ACD opens 712 a first block of channels from the total potential connection list 408. The process of opening the first block of channels includes: (i) passing to both the cell statistics counters 311 and the current opened connection block table 411 the VP/VC pairs of each of the channels to be opened in the block; and (ii) instructing the SAR driver 312 to initialize the SAR engines on the interface card 308 so that the cell statistics counter 311 maintains statistics concerning the number of data cells, i.e., cells that are neither idle cells nor unassigned cells, that are received from each channel in the opened connection block. This initial filtering of captured cells is advantageous because it reduces the required receive buffer size by skipping analysis of those cells transmitted on channels other than the opened channels or those cells that do not contain relevant data.

The active channel detection mode 702 continues by initiating 714 a timer, which determines how much time the ACD will spend in statistics mode check 720, checking the first connection block for active channels, and determining the AAL service type for each channel discovered to be active, as described below with reference to FIGS. 8 through 15. One purpose of the ATM timer is to enable the ACD 402 to efficiently test the entire range of channels in the connection list by limiting the duration that each block of channels is tested. Until the timer expires, the ACD enters the statistics mode check 720. After the timer expires, the ACD 402 closes 722 all channels that remain open from the statistics mode check 702 and opens 724 the next connection block. The active channel detection mode continues to check blocks of connections until the mode is terminated 726. In a preferred embodiment, the user of the network analysis device 104 may terminate the active channel detection mode 702.

Figure 8:
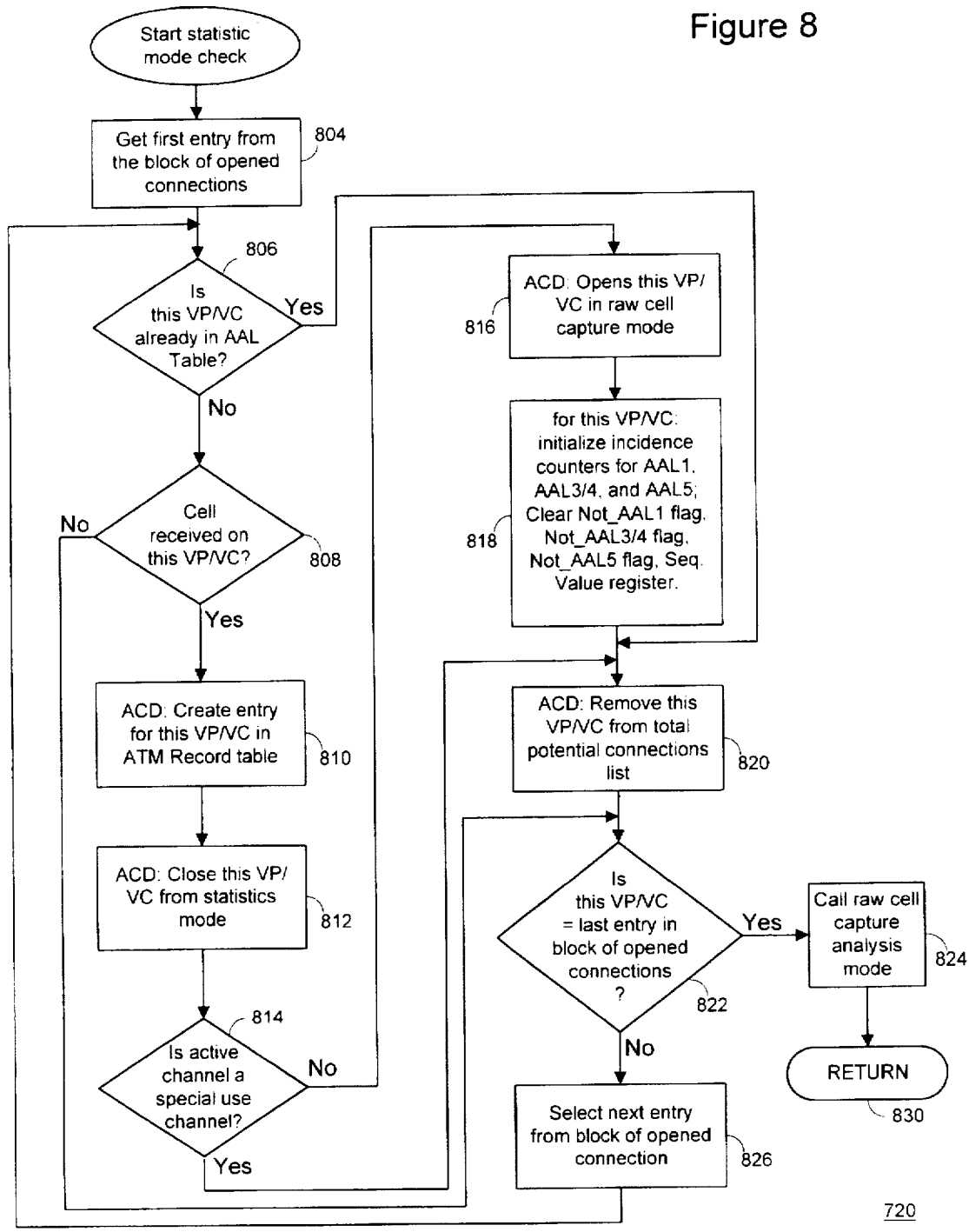

FIG. 8 is a flow chart illustrating the statistics mode check according to a preferred embodiment of the present invention. As described above, the cell statistics counters 311 identify the number of cells received on each open channel. The ACD 402 selects 804 a first channel in the open block connection table 411 corresponding to a first opened channel. The ACD 402 then determines 806 if the selected channel has an entry in the AAL table 410. If so, the ACD removes 820 that channel from the total potential connection list 408 and the current opened connection block table 411 and closes the channel out of statistics mode. If 822 the channel is not the last channel on the opened block connection table 411, the ACD selects 826 the next channel entry. An entry in the AAL table 410 indicates that the signaling engine 404 received, at minimum, a setup message for that channel in the signal message check mode 502 which typically contains the AAL service type to be setup on that channel and an indication that the channel may soon be active (i.e., a connect signaling message may be sent).

When the ACD 402 selects a channel in the opened connection block table 411 that does not have an entry in the AAL table 410, the ACD 402 checks the statistical area of the counter region 311 to determine 808 if any received data cells correspond to the selected opened channel. If no data cells were received on the selected opened channel, the ACD determines 822 if the selected opened channel is the last channel in the block connection table. If not, the ACD 402 selects 826 a next channel from the opened connection block table 411.

If the cell statistics counters 311 indicate that data cells were received 808 on the selected opened channel, the ACD 402 creates 810 a data structure entry for the selected opened channel in the ATM Record Table 412, including an identification that the selected opened channel is active. The ACD 402 then closes 812 the selected opened channel in statistics mode and removes the selected opened channel from the opened connection block table 411, the total potential connection list 408, and the cell statistics counters 413. Once the ACD 402 identifies an active channel, it determines 814 if the active channel is one of an ATM special use channel, such as the signaling channel e.g., 0/5, the interim local management interface channel e.g., 0/16, or the operation, administration and maintenance channels, e.g., X/3 or X/4 where X is any VP value. If the active channel is a special use channel, the ACD 402 removes 820 the special use channel from the total potential connection list and block connection list, and selects 826 the next entry from the open connection block table 411.

If the active channel is not a special use channel, the ACD 402 opens 816 the active channel in raw cell capture mode and receives raw cells from this active channel into the raw cell capture buffer 313 for the purpose of AAL typing the channel by the AAL Type Determinator 406, for example. The ACD 402 also initializes 818 flags for use in determining the AAL service type for the active channel. AAL typing of the active channels is described below with reference to FIGS. 10 through 13 according to a preferred embodiment of the present invention. The ACD removes 820 the active channel from the total potential connection list 408 and the opened block connection table 411. The ACD 402 determines whether the active channel corresponds to the last channel in the opened block connection table 411, and if not, the ACD selects 826 a next channel from the opened block connection table 411 to continue the statistics mode check 720. If the opened channel that was checked is the last channel in the opened block connection table 411, the ACD 402 begins 824 the raw cell capture analysis mode 902, as described with reference to FIG. 9 through 13.

Figure 9:
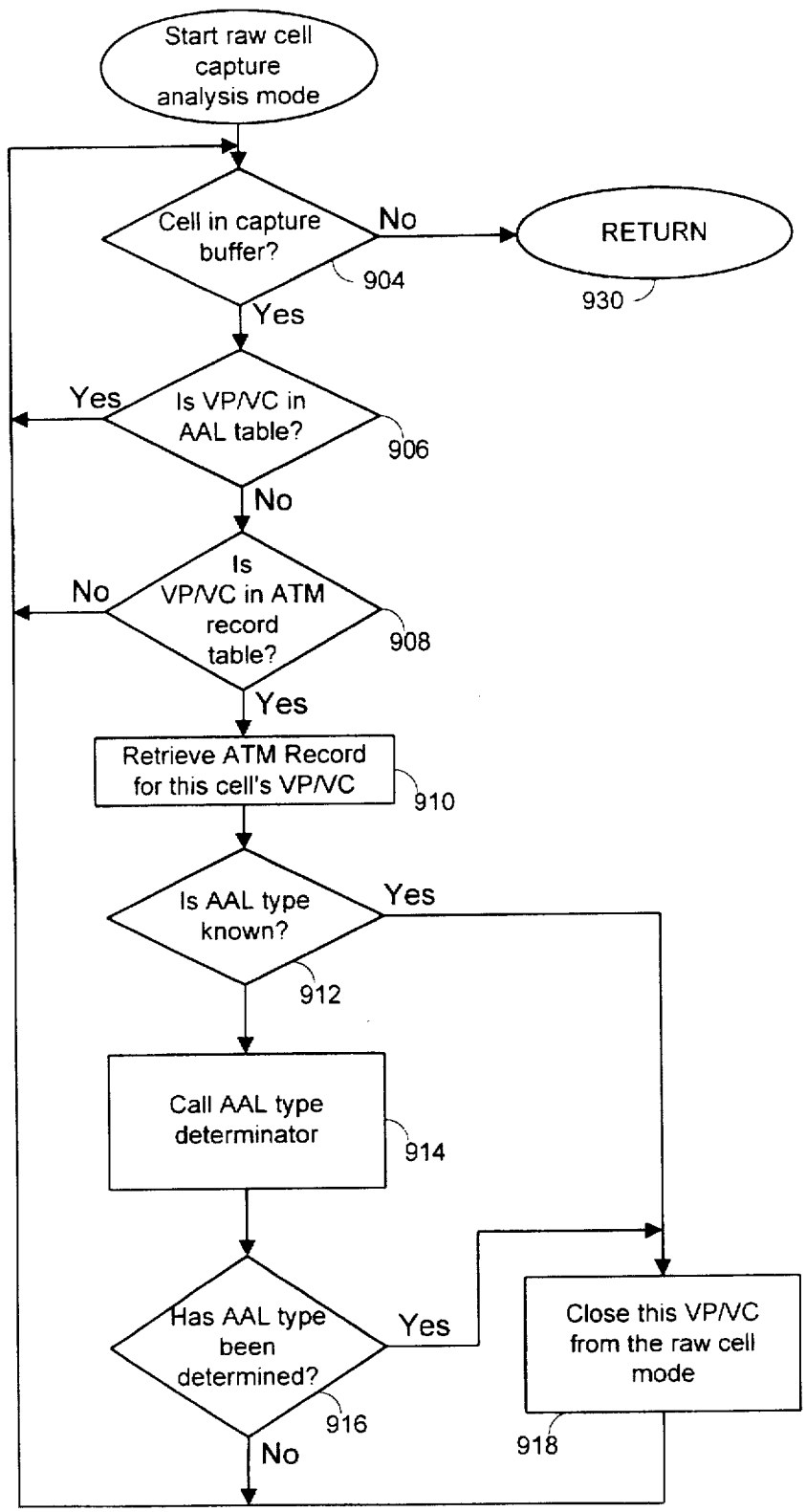

FIG. 9 is a flow chart illustrating the raw cell capture analysis mode according to a preferred embodiment of the present invention. The ACD 402 determines 904 whether there are data cells in the raw cell capture buffer 313 for AAL typing. If there are no data cells for AAL typing, the ACD returns 930 to the statistics mode check and then returns 830 to the active channel detection mode 702. If there are data cells in the raw cell capture buffer 313 to be used for AAL typing, the ACD 402 determines the channel associated with the data cell and determines 906 if that channel has an entry in the AAL table 410. Determining 906 if the channel has an entry in the AAL table avoids needing to determine the AAL service type for the channel since the presence of an entry in the AAL table 410 indicates that the signaling engine 404 received a setup message for that channel, and, therefore, the AAL table 410 includes information identifying the AAL service type for that channel. If the channel corresponding to the data cell does not have an entry in the AAL table 410, the ACD 402 determines 908 if the channel corresponding to the data type is in the ATM record table 412. If so, the ACD 402 retrieves 910 the ATM record for the channel and checks 910 the data structure for the channel in ATM Record Table 412 to determine 912 if the AAL service type for the channel is already known. If 912 the AAL service type for the channel is already known, the ACD 402 closes 918 the channel associated with the data cell. If 912 the AAL service type for the channel is not known, the ACD 402 calls 914 the AAL Type Determinator 406 which attempts to determine the AAL service type of the channel. Some functions performed by the AAL Type Determinator 406 are described in greater detail below with reference to FIGS. 10 through 13.

If the AAL Type Determinator 406 identifies 916 the AAL service type of the channel, then the channel is closed 918 so that no additional cells from that channel will enter the raw cell capture buffer 313. If the AAL Type Determinator 406 is unable to identify the AAL service type of the channel, the ACD 402 returns to continue checking data cells in the raw cell capture buffer 313.

Figure 10A:
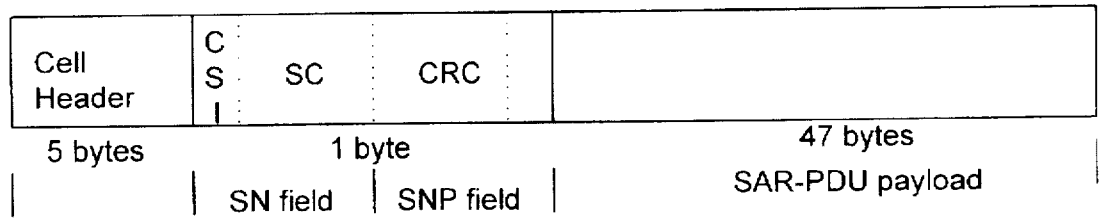
FIG. 10(a) is an illustration of a segmentation and reassembly protocol data unit for AAL-1.
Figure 10B:
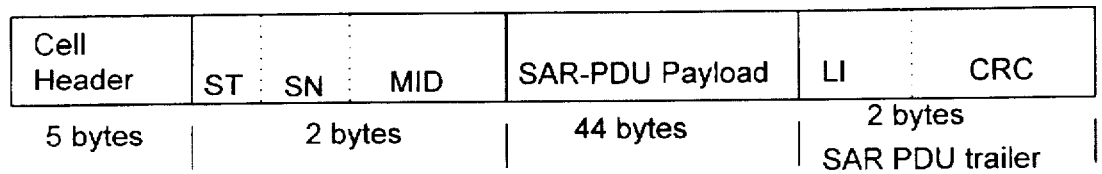
FIG. 10(b) is an illustration of a segmentation and reassembly protocol data unit for AAL-3/4.
Figure 10C:
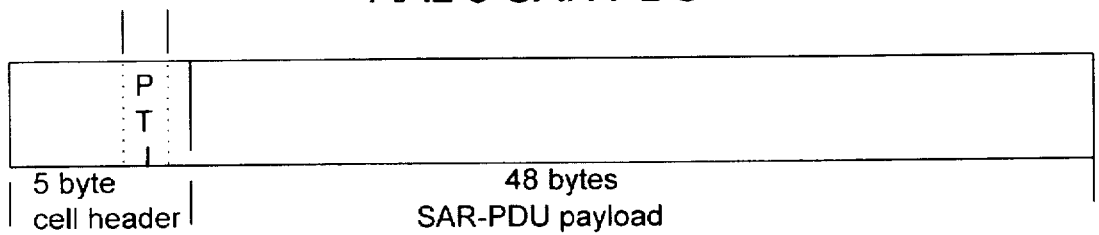
FIG. 10(c) is an illustration of a segmentation and reassembly protocol data unit for AAL-5.

In the preferred embodiment, the AAL Type Determinator can distinguish which service class an active ATM channel is utilizing, such as AAL1, AAL-3/4 or AAL5. Additional service classes can also be distinguished using the technique described below while adding, subtracting, or substituting one or more distinguishing features of an additional protocol. FIG. 10(a) is an illustration of a segmentation and reassembly protocol data unit (SAR-PDU) for AAL1. The AAL1 service container begins with a 5 byte cell header followed by a SAR-PDU of 48 bytes. The first byte of the SAR-PDU following the cell header is divided into a 4 bit sequence number (SN) and a 4 bit sequence number protection (SNP) field. The SN includes a one bit convergence sublayer indication (CSI) bit and a three bit sequence count (SC) field. The last 47 of the bytes comprise the SAR-PDU payload. FIG. 10(b) is an illustration of a SAR-PDU for AAL-3/4. The AAL-3/4 service container begins with a 5 byte cell header followed by a SAR-PDU of 48 bytes. The SAR-PDU header is 2 bytes, the SAR-PDU payload is 44 bytes and the SAR-PDU trailer is 2 bytes. The two byte header includes a two bit segment type (ST), a four bit sequence number (SN) and a ten bit multiplexing identifier (MID). The two byte trailer includes a six bit length indicator (LI) and a ten bit cyclic redundancy check (CRC). FIG. 10(c) is an illustration of a SAR-PDU for AAL5. The AAL5 service container begins with a 5 byte cell header followed by a SAR-PDU of 48 bytes. The cell header contains a 3 bit payload type indicator (PTI). The SAR-PDU payload is 48 bytes. A more detailed description of the various AAL service types is found in Goralski, *Introduction to ATM Networking* (1995) and McDysan and Spohn, *ATM: Theory and Application* (1995), that are both incorporated by reference herein in their entirety.

Figure 11:
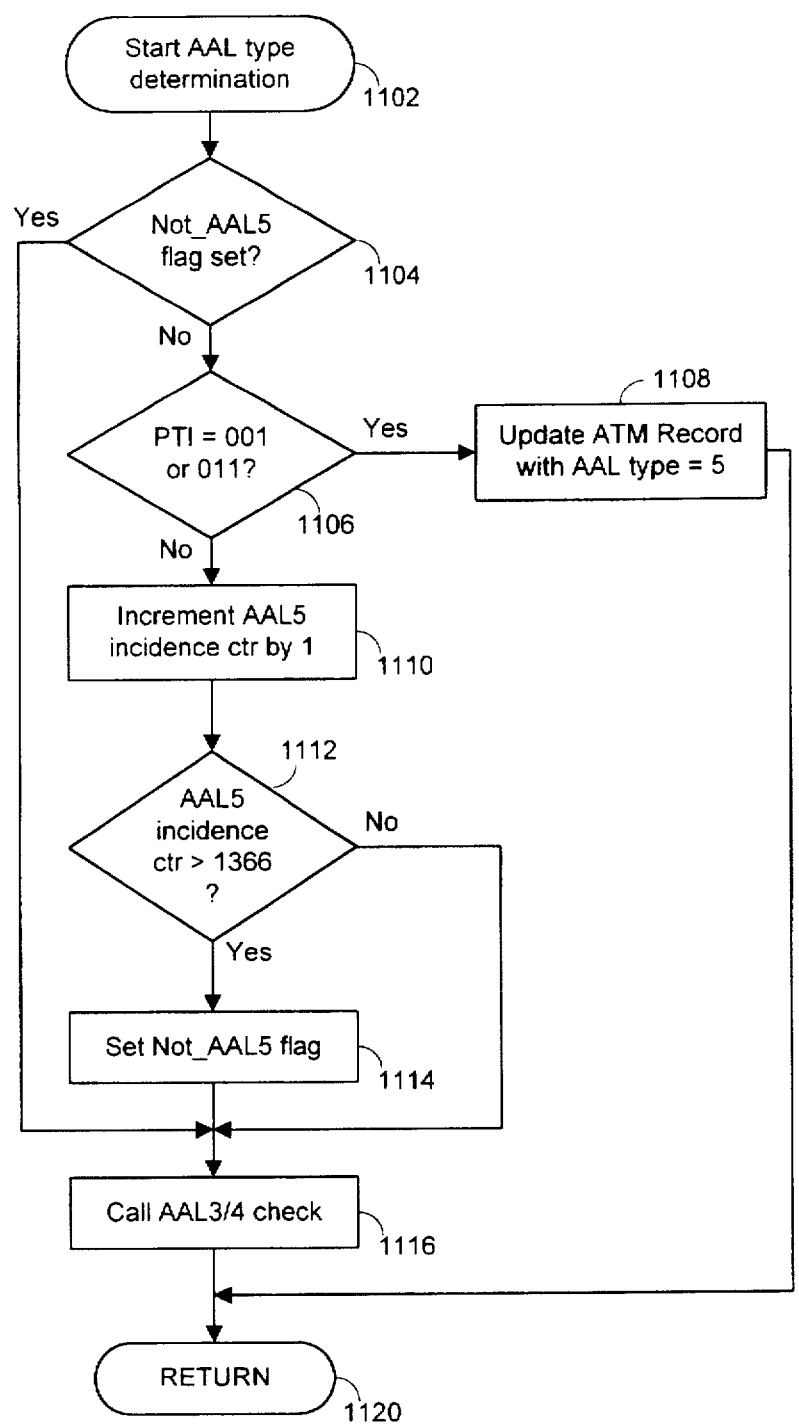
FIG. 11 is a flow chart illustrating the method of determining whether an active channel is utilizing AAL1 service according to a preferred embodiment of the present invention.
Figure 12:
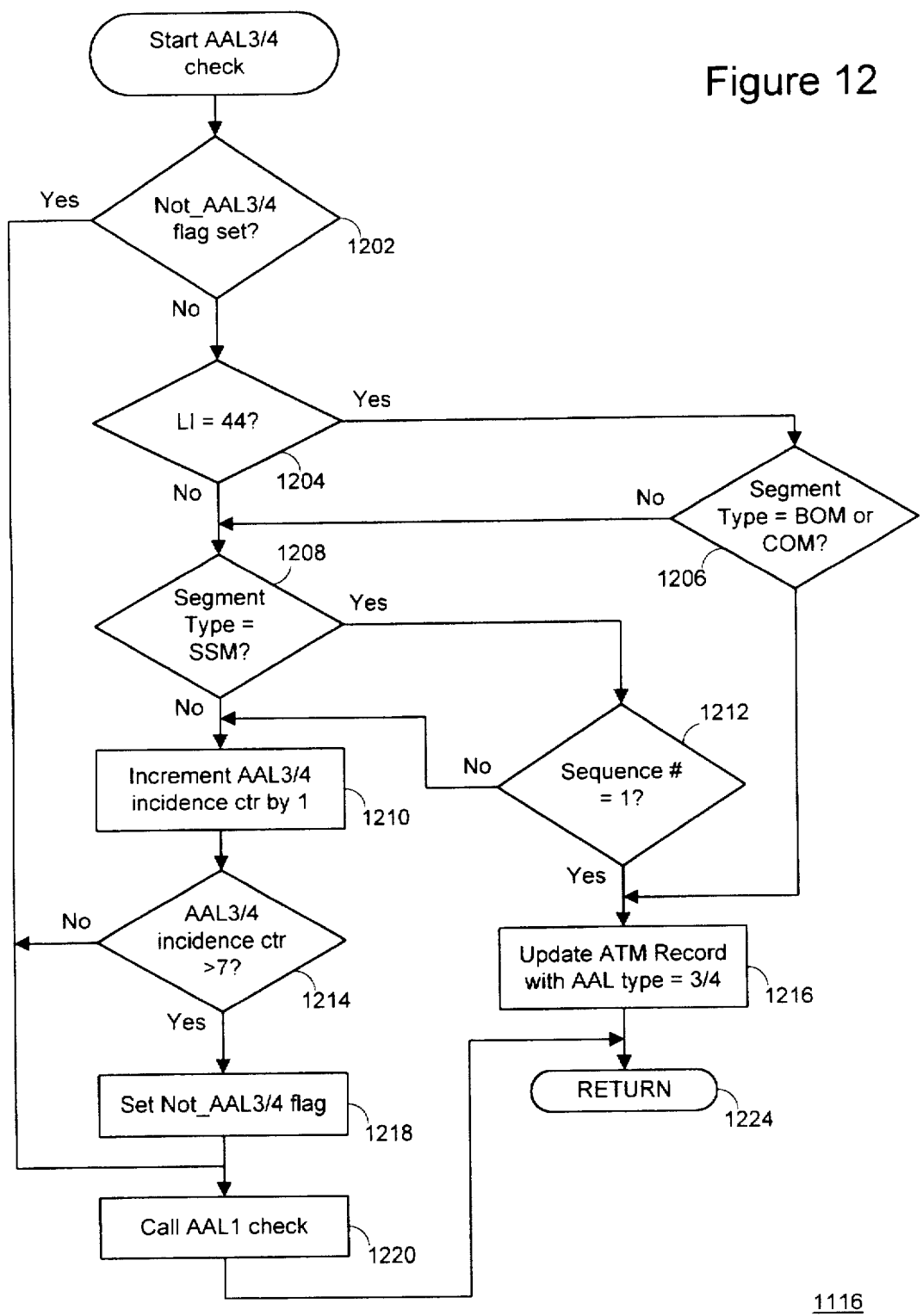
FIG. 12 is a flow chart illustrating the method of determining whether an active channel is utilizing AAL3/4 service according to a preferred embodiment of the present invention.
Figure 13:
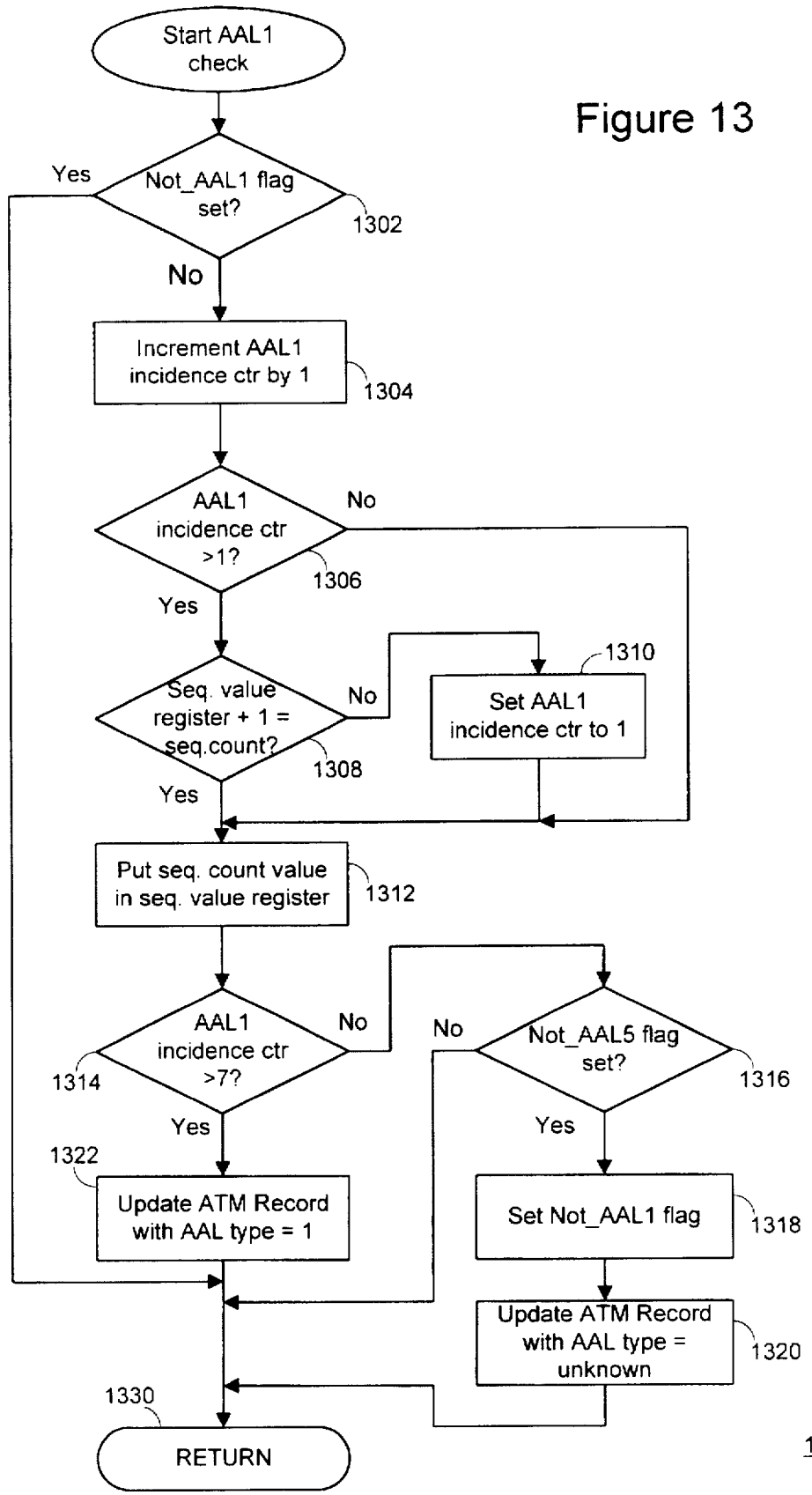
FIG. 13 is a flow chart illustrating the method of determining whether an active channel is utilizing AAL5 service according to a preferred embodiment of the present invention.

The present invention determines the AAL service type utilized by an ATM channel by analyzing a few bits of one or more captured cells. FIGS. 11 through 13 are flow charts illustrating the method of determining the AAL service types for active channels detected through the active channel detection mode 702 according to a preferred embodiment of the present invention. FIG. 11 is a flow chart illustrating the AAL5 check mode according to a preferred embodiment of the present invention for determining whether an active channel is utilizing AAL5. The method 1102 begins with the AAL Type Determinator 406 checking the ATM Record Table 412 to determine 1104 if the Not$_{13}$AAL5 flag has been turned on, which indicates that the AAL Type Determinator 406 has determined that the channel is not utilizing AAL5. If the Not_AAL5 flag is on, then the AAL Type Determinator 406 begins 1116 the AAL-3/4 determination mode, which is described more fully with regard to FIG. 12.

If the Not_AAL5 flag is off, the AAL Type Determinator 406 analyzes 1106 the data cell and checks whether the bits corresponding to the PTI are either 001 or 011. If the channel is utilizing AAL5 service, a PTI with the value of 001 or 011 will occur in the last cell of an AAL5 frame. If the PTI of the data cell is 001 or 011, then the AAL Type Determinator 406 updates the ATM Record Table to indicate that the channel corresponding to the analyzed data cell is utilizing the AAL5. If the PTI of the data cell is neither 001 nor 011, then an AAL5 incidence counter for that channel is incremented 1110 by 1. The AAL Type Determinator 406 then checks the ATM Record Table 412 to determine 1112 whether the AAL5 incidence counter has reached a designated level. If the incidence counter is greater than the designated level i.e., the AAL Type Determinator 406 has analyzed a designated number of data cells from a channel and none of them have the appropriate AAL5 characteristics, then the AAL Type Determinator 406 updates 1114 the ATM Record Table to indicate that the channel corresponding to the analyzed data cell is not utilizing AAL5. According to a preferred embodiment of the present invention, the incidence counter must reach a level greater than 1366, which corresponds to a total frame size of greater than 64 Kbytes which is in excess of the maximum permitted size of an Ethernet frame. It will be apparent to persons skilled in the art that alternate maximum values of the incidence counter can be selected. If the AAL5 incidence counter has not reached the designated level, the AAL Type Determinator 406 begins 1116 the AAL-3/4 check mode, as set forth more fully with regard to FIG. 12.

FIG. 12 is a flow chart illustrating the method of determining whether an active ATM channel is utilizing AAL-3/4 services according to a preferred embodiment of the present invention. The AAL Type Determinator 406 checks the ATM Record Table 412 to determine 1202 if the Not_AAI-3/4 flag has been turned on, which, if on, indicates that the channel corresponding to the data cell being analyzed has been determined not to be utilizing AAL-3/4. If the Not_ AAL type 3/4 flag is on, i.e., the channel is not utilizing the AAL service type 3/4 protocol, the AAL Type Determinator 406 begins the AAL1 determination mode 1220, that is described below with reference to FIG. 13. If the ATM Record Table 412 does not indicate that the channel is not utilizing AAL-3/4, the AAL Type Determinator 406 analyzes the data cell to determine 1204 if the six bits corresponding to the position of the LI bits in an AAL-3/4

SAR-PDU are equal to 44. If the LI is equal to 44, the AAL Type Determinator 406 also checks 1206 the data cell to determine whether the bits corresponding to the ST in an AAL-3/4 SAR-PDU represents a beginning of message (BOM) type or a continuation of message (COM) type, i.e., not an End of Message (EOM) or Single Segment Message (SSM) type. If the ST is a BOM or COM, then the AAL Type Determinator 406 updates 1216 the ATM Record Table 412 to indicate that the channel associated with the analyzed data cell is utilizing the AAL service type 3/4 protocol and the ACD returns 1224, 1120 to the raw cell capture analysis mode.

If the LI of the cell is not 44, then the AAL Type Determinator 406 determines 1208 if the bits corresponding to the ST for AAL-3/4 indicate that it is a Single Segment Message (SSM). If the ST indicates the cell is a SSM, then the AAL Type Determinator 406 determines 1212 if the sequence number for the data cell is 1. If the cell is a SSM and the sequence number for the cell is 1, then the AAL Type Determinator 406 updates the ATM Record Table 412 to indicate 1216 that the channel associated with the data cell is utilizing AAL-3/4 protocol and returns 1224, 1120 to the raw cell capture analysis mode.

If the channel has not been identified as AAL-3/4, the AAL-3/4 incidence counter is incremented 1210 by 1. The AAL Type Determinator 406 checks 1214 whether the AAL-3/4 incidence counter is greater than a determined level, and if so, the AAL Type Determinator 406 updates the ATM Record Table 412 to indicate 1218 that the channel associated with the data cell is not utilizing the AAL-3/4 protocol and the AAL Type Determinator 406 begins 1220 the AAL1 determination mode. If the AAL-3/4 incidence counter is not greater than a determined level, then the AAL Type Determinator 406 begins 1220 the AAL1 determination mode. According to a preferred embodiment of the present invention, the incidence counter's determined level for the AAL-3/4 determination mode is 7.

FIG. 13 is a flow chart illustrating the method determining whether an active ATM channel is utilizing the AAL1 service according to a preferred embodiment of the present invention. The AAL Type Determinator 406 checks the ATM Record Table 412 to determine 1302 if the Not_AAL1 flag has been turned on, which, if on, indicates that the channel corresponding to the data cell being analyzed has been determined not to be utilizing AAL1. If the Not_AAL1 flag is on, i.e., the channel is not utilizing the AAL service type 1 protocol, then the AAL Type Determinator 406 returns 1330, 1224, 1120 to the raw cell capture analysis mode. If the Not$_{13}$ AAL1 flag is off, the AAL Type Determinator 406 increments 1304 the AAL1 incidence counter by 1, and determines 1306 if the incidence counter is greater than 1. If the AAL1 incidence counter is greater than 1, the AAL Type Determinator 406 checks 1308 whether the sequence value register is 1 less than the bits representing the SC of the analyzed cell, i.e., does the SC of the analyzed cell have a value of which is one greater than the value of the previous data cell. If so, the value of the SC is placed in the sequence value register. If the sequence value register does not have a value that is one less than the value of the bits representing the SC of the data cell, then the AAL Type Determinator 406 sets 1310 the AAL1 incidence counter equal to 1. The AAL1 type determinator 406 determines 1314 if a determined number of cells have been detected to have sequential SC values. According to a preferred embodiment of the present invention, the determined number of cells to check for SC sequence is 7 cells. If more than the determined number of cells have sequential SC values, then the AAL Type Deter-minator 406 updates 1322 the ATM Record Table 412 to indicate that the channel corresponding to the data cell is utilizing AAL1.

If the AAL service type 1 incidence counter is less than 7, the AAL Type Determinator 406 checks 1316 whether the Not_AAL5 flag is on. If the Not_AAL5 flag is off, the AAL Type Determinator 406 returns 1330, 1224, 1120 to the raw cell capture analysis mode. If the Not_AAL5 flag is on, the AAL Type Determinator 406 has checked the determined number of cells, for utilization of AAL5, a number that exceeds the 7 cells used to identify the channel as utilizing AAL1 and AAL-3/4. Accordingly, the AAL Type Determinator 406 then sets 1318 the Not_AAL1 flag on and updates 1320 the ATM Record Table to indicate that the channel associated with the analyzed data cell is utilizing an unknown protocol, and the AAL Type Determinator 406 returns 1330, 1224, 1120 to the raw cell capture analysis mode.

The remaining steps in the active channel detection process are described with reference to FIGS. 14 and 15. FIG. 14 is an example of the active channel detection process according to a preferred embodiment of the present invention. In FIG. 14, ten time indices are illustrated, $t_{-1}$ through $t_8$, with a time duration between each index of 0.5 seconds. In addition, the figure illustrates ATM cell traffic for three channels. The three channels are VP/VC=0/34, 0/56, 0/255, i.e., channels 0/34, 0/56 and 0/255. In this example, the signaling engine 404 does not receive any signaling messages for these three channels at any time $t_{-1}$ through $t_8$, and the AAL table is empty. The term "cells" in FIG. 14 indicates that ATM data cells appear on the corresponding channel at the particular time. At time $t_{-1}$ the ATM network analysis device initialization occurs 702 and the ACD receives 704 the starting and ending VP/VC range values. For this example, the starting and ending VP/VC range are channels 0/1 through 0/200, i.e., 200 channels. The ACD 402 creates 706 a total potential connection list 408 for the range of channels, initializes 708 an AAL table 410 and an ATM Record Table 412, and initializes 710 the signaling message handlers 403. As described above, the ACD 402 then opens 712 a block of connections in statistics mode 720. The first block of open channels are channels 0/1 through 0/50, i.e., 50 channels, which are stored in the opened block connection table 411. At time to the ACD starts 714 the ATM timer. In this example the ATM timer is set for 0.5 seconds.

At time $t_0$, the open channels are 0/1 through 0/50. ATM cells are present on the network on channels 0/34, 0/56 and 0/255. As discussed above, the active channel detection process 702 captures ATM cells only on the opened channels. The ACD 402 begins by checking whether the first channel in the opened block connection table (0/1) has a corresponding entry in the AAL Table. Since the channel is not in the AAL Table, because the example assumes that the AAL Table is empty throughout the relevant time period, the ACD 402 checks 806 the cell statistics counters to determine whether any ATM data cells were received on channel 0/1. The cell statistics counters do not identify any cells received on channel 0/1, so the ACD 402 checks 822, 826 if the next channel, i.e., 0/2 is in the AAL Table 410, and if not, checks 808 whether cells were received on that channel. The process continues until the ACD 402 reaches channel 0/34, when the cell statistics counters indicate that cells were received on the channel Upon detection of cells on channel 0/34, the ACD 402 creates 810 an entry for channel 0/34 in the ATM Record Table 412, and the channel 0/34 statistics counter is stopped 814. The ACD 402 checks whether channel 0/34 is a special use channel (as would be the case with other channels in the open block, e.g., channels 0/3, 0/4, 0/5, and 0/16 as described above), and since channel 0/34 is not a special use channel, the channel is opened 816 in raw cell capture mode. AAL service type counters and flags are initialized 818 for channel 0/34, the channel is removed from the total potential connection list 408 and the ACD 402 sequentially checks the rest of the channels in the opened block connection table (i.e. 0/35 through 0/50).

Once the ACD 402 reaches 822 the last entry in the block connection table, the ACD 402 begins the raw cell capture analysis mode 824 to determine the AAL service type for channel 0/34. The ACD 402 checks 904 for cells in the raw cell capture buffer 313, and upon finding a cell, checks the AAL table 410 to determine 906 whether the AAL service type for the channel is known. Since there is no entry in the AAL table 410 for channel 0/34, the ACD 402 checks the ATM Record table 412 to determine 908 whether the AAL service type is known for channel 0/34. If the AAL service type is not known, the ACD 402 calls 914 the AAL Type Determinator 406 which attempts to determine the ALL service type for the channel. The AAL Type Determinator 406 runs through its AAL service type checks on the cell 1102, 1116, 1220 and returns to the raw cell mode. If the AAL Type Determinator 406 identified the AAL service type for the channel, the AAL Type Determinator 406 updates the ATM Record Table 412 and the channel corresponding to the analyzed data cell is closed. No additional raw cells are captured on the closed channel. When all cells in the raw cell capture buffer 313 have been analyzed, the ACD returns 930, 830 to active channel detection mode, the timer is checked to determine 718 whether it has expired, and if not, the ACD opens all remaining channels on the opened block connection list, and calls 720 the statistics mode check routine again. It is envisioned that alternate techniques for determining when to select the next block of open channels can be utilized, for example, selecting each open connection a predetermined number of times.

Since the ATM timer is set for 0.5 seconds, the ACD 402 determines 718 that the ATM timer expires at time $t_1$. The ACD 402 closes 722 all of the remaining open channels and opens 520 a new block of connections, e.g., channels 0/51 through 0/100. The ACD 402 then resets and starts 714 the ATM timer for the second block of open connections. As described above, the cell statistics counters 311 are opened only for the open connection block, i.e., channels 0/51 through 0/100. The active channel detection process captures cells on channel 0/56 at time $t_1$. Channel 0/56 is removed from the potential connection list 408, that is opened 816 in raw cell capture mode 902. After 15 the cell statistics counter associated with channel 0/100 has been checked, the AAL Type Determinator 406 attempts to determine the AAL service type for the active channel and adds channel 0/56 to the ATM record table 412.

No other ATM cells are captured on an open channel in the $t_1$–$t_2$ time period.

At time t2 the ACD 402 determines 718 that the ATM timer has expired. The ACD closes 722 all remaining open connections, i.e., channels 0/51 through 0/55 and channels 0/57 through 0/100, and opens 724 a new block of connections, i.e., channels 0/101 through 0/150. The cell statistics counters 311 will not indicate any activity on the relevant channels during the $t_2$–$t_3$ time period. The process of opening connection blocks, detecting active channels and identifying AAL service types for the channels continues as described above. However, since the connection range selected by the user only includes channels 0/1 through 0/200, cell traffic on channel 0/255 will not be detected.

At time $t_3$ the ACD 402 determines 718 that the ATM timer has expired. The ACD closes 722 all remaining open connections, i.e., channels 0/101 through 0/150, and opens 724 a new block of connections, i.e., channels 0/151 through 0/200. No ATM cells are captured during $t_3$–$t_4$. At time t4 the ACD 402 determines 718 that the ATM timer has expired. The ACD closes 722 all opened connections, i.e., channels 0/151 through 0/200, and opens 724 a new block of connections, i.e., channels 0/1 through 0/2, 0/6 through 0/15, 0/17 through 0/33 and 0/35 through 0/50 since active channel 0/34 and special channels 0/3, 0/4, 0/5, and 0/16 have been removed from the potential connection list during the first pass and are, therefore, no longer part of the potential connection list during subsequent passes. The entire process then continues until a user interrupt is received. As stated above, ATM cells are received only on channel 0/34 and channel 0/56. Since channel 34 and channel 56 are closed from the total potential connection list 408, and channel 255 is outside the range of open channels, no additional ATM cells will be received by the ACD 402.

FIG. 15 is an illustration of an example of the signal detection process according to a preferred embodiment of the present invention. In FIG. 15 a time line including eleven time indices $t_{-1}$ through $t_9$ is shown. For time indices to through $t_8$ a signal message ("msg") is processed by the signaling engine. For this example, the duration between consecutive time indices varies. The type of signal message, i.e., setup, connect, or release, and the CRN are provided for each signal message. At time to, the SAR driver 312 notifies the signaling engine 404 that a frame has been received on the signaling channel. The signaling engine 404 determines 508 if the signal frame has a service-specific connection-oriented protocol (SSCOP) trailer, or a trailer indicative of another supported protocol. For this example, each of the signal messages includes a SSCOP trailer. If the captured signal message does not have a SSCOP trailer, then the signaling engine 404 ignores the signal message However, if a SSCOP trailer is detected, the signaling engine 404 checks the CRN of the signal message, i.e. CRN=5, and accesses the CRT 409 to determine 510 if the CRN of the signal message is in the CRT 409.

In this example, the CRT 409 is initially empty, so the CRN is not in the CRT 409. The signaling engine 404 determines 512 that the signal message is a setup message. If the signal message is not a setup message, the signaling engine ignores the signal message. The signaling engine 404 adds 514 the CRN (5) to the CRT 409, stores the setup details in the CRT 409, e.g., the sender address and the sendee address, and stores the status of the request in the CRT 409, e.g., not active. The signaling engine 404 then calls 514 the setup signal handler 602, that is contained in the signal handler module 403 in the discovery module 310. In this example, the AAL table 410 is initially empty, therefore the setup signal handler mode 602 adds the connection to the AAL table 410 and identifies the channel as not active.

At time $t_1$ the signaling engine 404 receives a signal message that, has a SSCOP trailer. The signaling engine 404 determines if the signal message's CRN is in the CRT 409. Since a CRN=5 was entered into the CRT 409 in response to the signal message received at time $t_0$, the signaling engine 404 determines 516, 520, 524 what type of signal message was sent. Since the signal message is a connect message, the signaling engine 404 updates 522 the CRT 409 entry for the CRN and calls the connect signal handler mode 622. The connect signal handler mode 622 updates the AAL table 410 to indicate that the channel is active. The connect signal handler then returns execution flow to the signaling engine 404, that awaits notification from the SAR driver 312 that another signal message has been captured, as described above.

At time $t_2$ the signaling engine 404 receives a signaling message, i.e., a message having a SSCOP trailer. The signaling engine 404 determines 510 if the signal message's CRN (5) is in the CRT 409. A CRN equal to five was entered into the CRT 409 in response to the signal message received at time $t_0$ and was updated at $t_1$. The signaling engine 404 determines 516, 520, 524 that the signal message is neither a setup message nor a connect message. Instead, the signaling engine 404 determines 524 that the signal message is a release message. In response to the release message, the signaling engine 404 deletes 526 the CRN (5) from the CRT 409 and calls the release signal handler mode 642, that updates 644 the AAL table 410 to indicate that the channel is not active. The release signal handler then returns execution flow to the signaling engine 404, which awaits notification from the SAR driver 312 that another signal message has been captured, as described above. At this time the CRT 409 is empty.

At time $t_3$ the signaling engine 404 receives a signal message having a CRN=7. Since the signal message has a SSCOP trailer, the signaling engine 404 determines 510 if the signal message's CRN is in the CRT 409, and since it is not, the signaling engine 404 determines 512 whether the signal message is a setup message. Since it is a setup message, the signaling engine adds 514 the CRN (7) to the CRT 409, stores the setup details, and calls the setup signal handler as described above with reference to time $t_0$.

At time $t_4$ the signaling engine 404 receives a signal message having a CRN=7. Since the signal message has a SSCOP trailer, the signaling engine 404 determines 510 if the signal message's CRN is in the CRT 409. A CRN of seven was entered into the CRT 409 in response to the signal message received at time $t_3$. The signaling engine 404 determines 516 that the signal message is a setup message. The receipt of another setup message having a CRN of seven while another setup message having the same CRN is stored in the CRT indicates that the first received setup message, i.e., received at time $t_3$, is no longer valid. Therefore, the signaling engine 404 replaces 518 the CRT entry associated with the CRN. The signaling engine 404 then calls the setup signal handler mode 602 that proceeds in the manner described above.

At time $t_5$ the signaling engine 404 receives a signal message having a CRN=9. Since the signal message has a SSCOP trailer, the signaling engine 404 determines 510 if the signal message's CRN is in the CRT 409. A CRN equal to nine has not been entered into the CRT 409. Therefore the signaling engine determines 512 if the signal message is a setup message. Since the signal message is not a setup message, it is a connect message, the signal message is ignored by the signaling engine 404.

At time $t_6$, the signaling engine 404 receives a signal message with an SSCOP trailer having a CRN=5. Although signal messages having a CRN equal to five were previously received by the signaling engine 404 at times $t_1$, $t_2$, and $t_3$, the signaling engine 404 deleted 628 the CRN=5 from the CRT 409 in response to the release message at time $t_3$. Therefore, the signaling engine 404 determines 510 that the signal message's CRN is not in the CRT 409 and that the signal message is 512 a setup message. The signaling engine 404 then adds 514 the CRN (5) to the CRT 409, stores the setup details from the signal message, and calls the setup signal handler mode 602 as described above. At this time the CRT 409 includes information on a CRN of 5 and CRN of 7.

At time $t_7$, the signaling engine 404 receives a signal message having a CRN=10. Since the signal message has a SSCOP trailer, the signaling engine 404 determines 510 if the signal message's CRN is in the CRT 409. As stated above, the CRT 409 only includes information on CRN=5 and CRN=7. Therefore the signaling engine 404 determines that the CRN of the signal message, i.e., 10, is not in the CRT 409. The signaling engine 409 determines 512 that the signal message is a setup message and adds 514 to the CRN (10) to the CRT, stores the setup details, and calls the setup signal handler mode 602 as described above with reference to time $t_0$.

At time $t_8$ the signaling engine 404 receives a signal message having a CRN=10. Since the signal message has a SSCOP trailer, the signaling engine 404 determines 510 if the signal message's CRN is in the CRT 409. A CRN of ten was entered into the CRT 409 in response to the signal message received at time $t_7$. The signaling engine 404 determines 516 that the signal message is not a setup message. Instead, the signaling engine 404 determines 520 that the signal message is a connect message. The signaling engine 404 updates 522 the CRT 409 with the channel information, identifies the CRN as active, and calls the connect signal handler.

At time tg, the CRT 409 includes information on CRN=5 (not active), CRN=7 (not active), and CRN=10 (active). In addition, the AAL table 410 includes the status information for each of these channels.

While the invention has been particularly shown and described with reference to a preferred embodiment, it will be understood by persons skilled in the relevant art that various changes in form and details can be made therein without departing from the spirit and scope of the invention.

What is claimed is:

1. A method for identifying active channels in an asynchronous transfer mode (ATM) network, the ATM network having a plurality of channels including a signaling channel, the method comprising the steps of:

(A) automatically monitoring the signaling channel to identify a first signal as a connect message associated with a first channel including the steps of:
  identifying said first signal as a signaling message if a first portion of said first signal matches a first protocol;
  comparing a second portion of said first signal with a predetermined connect identifier if said first signal is identified as the signaling message; and
  identifying said first signal as the connect message if said second portion of said first signal matches said predetermined connect-identifier and if said first signal is identified as the signaling message; and (B) identifying said first channel as an active channel, if said first signal is identified as said connect message.

2. The method of claim 1, wherein said step (A) further includes the steps of:
 receiving said first signal from the signaling channel; and
 comparing a second portion of said first signal with the first protocol.

3. A method for identifying active channels in an asynchronous transfer mode (ATM) network, the ATM network having a plurality of channels including a signaling, channel, the method comprising the steps of:

(A) automatically monitoring the signaling channel to identify a first signal as a connect message associated with a first channel;

(B) identifying said first channel as an active channel, if said first signal is identified as said connect message;

(C) automatically monitoring the signaling channel to identify a second signal as a release message, said release message associated with said first channel; and (D) identifying said first channel as not being one of the active channels, if said first signal is identified as said connect message associated with said first channel and if said second signal is identified as said release message associated with said first channel.

4. The method of claim 3, wherein step (C) includes the steps of:

identifying said second signal as the signaling message if a first portion of said second signal matches the first protocol; and identifying said second signal as the release message if a second portion of said second signal matches a predetermined release-identifier and if said second signal is identified as the signaling message.

5. The method of claim 4, wherein step (C) further includes the steps of:

receiving said second signal from the signaling channel; and comparing said first portion of said second signal with said first protocol.

6. A method for identifying active channels in an asynchronous transfer mode (ATM) network, the ATM network having a plurality of channels including a signaling channel, the method comprising the steps of:

(A) automatically monitoring the signaling channel to identify a first signal as a connect message associated with a first channel;

(B) identifying said first channel as an active channel, if said first signal is identified as said connect message; and (C) comparing a second portion of said first signal with a predetermined service type identification, to determine an ATM Application Layer (AAL) service type used by data cells on said first channel.

7. A method for identifying active channels in an asynchronous transfer mode (ATM) network, the ATM network having a plurality of channels including a signaling channel, the method comprising the steps of:

(A) automatically monitoring the signaling channel to identify a first signal as a connect message associated with a first channel;

(B) identifying said first channel as an active channel, if said first signal is identified as said connect message;

(C) identifying a first set of channels on the ATM network;

(D) opening said first set of channels at a first time; and (E) automatically monitoring said first set of open channels to identify a channel that is active.

8. The method of claim 7, wherein step (C) includes the step of:

determining a first range of channels wherein said first set of channels is one of a subset of said first range of channels and equal to said first range of channels.

9. The method of claim 8, further comprising the step of:

repeating steps (C), (D), and (E) until all channels in said first range have been selected to be in said first set.

10. The method of claim 9, wherein step (D) includes the steps of:

selecting a second channel from said first set of channels;

opening said second channel if said second channel is not identified as active; and removing said second channel from said first set of channels if said second channel is identified as active.

11. The method of claim 7, wherein step (E) includes the steps of:

selecting a second channel, said second channel one of said open channels;

monitoring said second channel for data cells;

determining if a data cell corresponding to said second channel was received since said first time; and identifying said second channel as active if said data cell was received on said second channel since said first time.

12. The method of claim 11, further comprising the step of:

repeating said steps of selecting a second channel, monitoring said second channel, determining if a data cell corresponding to said second channel was received, and identifying said second channel as active, for each channel in said first set of channels.

13. The method of claim 12, further comprising the step of:

removing said second channel from said first set of channels if said second channel is identified as active.

14. The method of claim 13, further comprising the step of:

repeating steps (C), (D), and (E).

15. The method of claim 13, further comprising the step of:

removing said second channel from said first set of channels if said second channel is a special use channel.

16. The method of claim 15, further comprising the step of:

repeating steps (C), (D), and (E).

17. The method of claim 12, further comprising the step of:

removing said second channel from said first range of channels if said second channel is identified as active.

18. The method of claim 7, further comprising the step of:

(F) automatically identifying an ATM application layer (AAL) service type used by data cells on a first active channel, said first active channel identified as active.

19. The method of claim 18, wherein step (F) includes the steps of:

(1) receiving a first data cell associated with a first active channel; and (2) identifying said AAL service type using contents of said first data cell if said first active channel was identified as active in step (E).

20. The method of claim 19, wherein step (F)(2) includes the steps of:

(a) determining if a first three-bit portion of said first data cell is equal to one of a binary value of one and a binary value of three; and (b) identifying said AAL service type as an AAL service type five if said first three-bit portion of said first data cell is equal to one of said binary value of one and said binary value of three.

21. The method of claim 20, wherein step (F)(2) further comprises the step of:

(c) determining if said AAL service type is an AAL service type three-four, including the steps of:

identifying said AAL service type as an AAL service type three-four if a first two-bit portion of said first data cell corresponds to a value representing one of a beginning of message segment type and a continuation of message segment type and if a first six-bit portion of said first data cell is equal to a binary forty-four; and identifying said AAL service type as an AAL service type three-four if said first two-bit portion of said first data cell corresponds to a value representing a single segment message segment type and a first four bit sequence number portion of said first data cell is equal to said binary value of one.

22. The method of claim 20, wherein step (F)(2) further comprises the step of:

(c) determining if said AAL service type is an AAL service type one, including the steps of:
determining a first three-bit sequence count value for said first data cell;
determining a second three-bit sequence count value for a second data cell if said AAL service type is not identified; and
identifying said AAL service type as an AAL service type one if said second three bit sequence count value is one greater than said first three-bit sequence count value.

23. The method of claim 19, further comprising the step of:
repeating said step (F) for all channels that are identified as active and whose AAL service type has not been identified.

24. The method of claim 19, wherein step (F)(2) includes the step of:

determining if said AAL service type is an AAL service type three-four, including the steps of:
identifying said AAL service type as an AAL service type three-four if a first two-bit portion of said first data cell corresponds to a value representing one of a beginning of message segment type and a continuation of message segment type and if a first six-bit portion of said first data cell is equal to a binary forty-four; and
identifying said AAL service type as an AAL service type three-four if said first two-bit portion of said first data cell corresponds to a value representing a single segment message segment type and a first four bit sequence number portion of said first data cell is equal to a binary value of one.

25. The method of claim 19, wherein step (F)(2) includes the step of:

determining if said AAL service type is an AAL service type one, including the steps of:
determining a first three-bit sequence count value for said first data cell;
determining a second three-bit sequence count value for a second data cell if said AAL service type is not identified; and
identifying said AAL service type as an AAL service type one if said second three bit sequence count value is one greater than said first three-bit sequence count value.

26. A method for identifying active channels in an asynchronous transfer mode (ATM) network, the ATM network having a plurality of channels including a signaling channel, the method comprising the steps of:

(A) automatically monitoring the signaling channel to identify a first signal as a setup message, said setup message associated with a first channel including the steps of:

identifying said first signal as a signaling message if a first portion of said first signal matches a first protocol;
comparing a second portion of said first signal with a predetermined setup message identifier if said first signal is identified as said signaling message; and
identifying said first signal as said setup message if said second portion of said first signal matches said predetermined setup-identifier and if said first signal is identified as said signaling message;

(B) automatically monitoring the signaling channel to identify a second signal as a connect message associated with said first channel; and (C) identifying said first channel as an active channel, if said first signal is identified as said setup message associated with said first channel and if said second signal is identified as said connect message associated with said first channel.

27. The method of claim 26, wherein step (A) further includes the steps of:
receiving said first signal from the signaling channel; and
comparing said first portion of said first signal with said first protocol.

28. The method of claim 26, wherein said first protocol is a service-specific connection oriented protocol.

29. A method for identifying active channels in an asynchronous transfer mode (ATM) network, the ATM network having a plurality of channels including a signaling channel, the method comprising the steps of:

(A) automatically monitoring the signaling channel to identify a first signal as a setup message, said setup message associated with a first channel;

(B) automatically monitoring the signaling channel to identify a second signal as a connect message associated with said first channel including the steps of:
identifying said second signal as said signaling message if a first portion of said second signal matches a first protocol;
comparing a second portion of said second signal with a predetermined connect identifier if said second signal is identified as said signaling message; and
identifying said second signal as said connect message if said second portion of said second signal matches said predetermined connect-identifier and if said second signal is identified as said signaling message; and (C) identifying said first channel as an active channel, if said first signal is identified as said setup message associated with said first channel and if said second signal is identified as said connect message associated with said first channel.

30. The method of claim 29, wherein step (B) further includes the steps of:
receiving said second signal from the signaling channel; and
comparing said first portion of said second signal with said first protocol.

31. A method for identifying active channels in an asynchronous transfer mode (ATM) network, the ATM network having a plurality of channels including a signaling channel, the method comprising the steps of:

(A) automatically monitoring the signaling, channel to identify a first signal as a setup message, said setup message associated with a first channel;

(B) automatically monitoring the signaling channel to identify a second signal as a connect message associated with said first channel;

(C) identifying said first channel as an active channel, if said first signal is identified as said setup message associated with said first channel and if said second signal is identified as said connect message associated with said first channel;

(D) automatically monitoring the signaling channel to identify a third signal as a release message, said release message associated with said first channel; and (E) identifying said first channel as not being one of the active channels, if said first signal is identified as said setup message associated with said first channel, if said second signal is identified as said connect message associated with said first channel, and if said third signal is identified as said release message associated with said first channel.

32. The method of claim 31, wherein step (D) includes the steps of:

identifying said third signal as a signaling message if a first portion of said third signal matches a first protocol; and identifying said third signal as a release message if a second portion of said third signal matches a predetermined release-identifier and if said third signal is identified as said signaling message.

33. The method of claim 32, wherein step (D) further includes the steps of:

receiving said third signal from the signaling channel; and comparing said first portion of said third signal with said first protocol.

34. A method for identifying active channels in an asynchronous transfer mode (ATM) network, the ATM network having a plurality of channels including a signaling channel, the method comprising the steps of:

(A) automatically monitoring the signaling channel to identify a first signal as a setup message, said setup message associated with a first channel;

(B) automatically monitoring the signaling channel to identify a second signal as a connect message associated with said first channel;

(C) identifying said first channel as an active channel, if said first signal is identified as said setup message associated with said first channel and if said second signal is identified as said connect message associated with said first channel; and (D) comparing a second portion of said first signal with a predetermined service type identification, to determine an ATM Application Layer (AAL) service type used by data cells on said first channel.

35. A method for identifying active channels in an asynchronous transfer mode (ATM) network, the ATM network having a plurality of channels including a signaling channel, the method comprising the steps of:

(A) automatically monitoring the signaling channel to identify a first signal as a setup message, said setup message associated with a first channel;

(B) automatically monitoring the signaling channel to identify a second signal as a connect message associated with said first channel;

(C) identifying said first channel as an active channel, if said first signal is identified as said setup message associated with said first channel and if said second signal is identified as said connect message associated with said first channel;

(D) identifying a first set of channels on the ATM network;

(E) opening said first set of channels at a first time; and (F) automatically monitoring said first set of open channels to identify a channel that is active.

36. The method of claim 35, wherein step (D) includes the step of:

determining a first range of channels wherein said first set of channels is one of a subset of said first range of channels and equal to said first range of channels.

37. The method of claim 36, further comprising the step of:

repeating steps (D), (E), and (F) until all channels in said first range have been selected to be in said first set.

38. The method of claim 37, wherein step (E) includes the steps of:

selecting a second channel from said first set of channels;

opening said second channel if said second channel is not identified as active; and removing said second channel from said first set of channels if said second channel is identified as active.

39. The method of claim 35, wherein step (F) includes the steps of:

selecting a second channel, said second channel one of said open channels;

monitoring said second channel for data cells;

determining if a data cell corresponding to said second channel was received since said first time; and identifying said second channel as active if said data cell was received on said second channel since said first time.

40. The method of claim 39, further comprising the step of:

repeating said steps of selecting a second channel, monitoring said second channel, determining if a data cell corresponding to said second channel was received, and identifying said second channel as active, for each channel in said first set of channels.

41. The method of claim 39, further comprising the step of:

removing said second channel from said first set of channels if said second channel is identified as active.

42. The method of claim 41, further comprising the step of:

repeating steps (D), (E), and (F).

43. The method of claim 41, further comprising the step of:

removing said second channel from said first set of channels if said second channel is a special use channel.

44. The method of claim 43, further comprising the step of:

repeating steps (D), (E), and (F).

45. The method of claim 39, further comprising the step of:

removing said second channel from said first range of channels if said second channel is identified as active.

46. The method of claim 35, further comprising the step of:

(G) automatically identifying an ATM application layer (AAL) service type used by data cells on a first active channel, said first active channel identified as active.

47. The method of claim 46, wherein step (G) includes the steps of:

(1) receiving a first data cell associated a first active channel; and (2) identifying said AAL service type using contents of said first data cell if said first active channel was identified as active in step (F).

48. The method of claim 49, wherein step (G)(2) includes the steps of:
  (a) determining if a first three-bit portion of said first data cell is equal to one of a binary value of one and a binary value of three; and
  (b) identifying said AAL service type as an AAL service type five if said first three-bit portion of said first data cell is equal to one of said binary value of one and said binary value of three.

49. The method of claim 48, wherein step (G)(2) further comprises the step of:
  (c) determining if said AAL service type is an AAL service type three-four, including the steps of:
    identifying said AAL service type as an AAL service type three-four if a first two-bit portion of said first data cell corresponds to a value representing one of a beginning of message segment type and a continuation of message segment type and if a first six-bit portion of said first data cell is equal to a binary forty-four; and
    identifying said AAL service type as an AAL service type three-four if said first two-bit portion of said first data cell corresponds to a value representing a single segment message segment type and a first four bit sequence number portion of said first data cell is equal to said binary value of one.

50. The method of claim 48, wherein step (G)(2) further comprises the step of:
  (c) determining if said AAL service type is an AAL service type one, including the steps of:
    determining a first three-bit sequence count value for said first data cell;
    determining a second three-bit sequence count value for a second data cell if said AAL service type is not identified; and
    identifying said AAL service type as an AAL service type one if said second three bit sequence count value is one greater than said first three-bit sequence count value.

51. The method of claim 47, further comprising the step of:
  repeating said step (G) for all channels that are identified as active and whose AAL service type has not been identified.

52. The method of claim 47, wherein step (G)(2) includes the step of:
  determining if said AAL service type is an AAL service type three-four, including the steps of:
    identifying said AAL service type as an AAL service type three-four if a first two-bit portion of said first data cell corresponds to a value representing one of a beginning of message segment type and a continuation of message segment type and if a first six-bit portion of said first data cell is equal to a binary forty-four; and
    identifying said AAL service type as an AAL service type three-four if said first two-bit portion of said first data cell corresponds to a value representing a single segment message segment type and a first four bit sequence number portion of said first data cell is equal to a binary value of one.

53. The method of claim 47, wherein step (G)(2) includes the step of:
  determining if said AAL service type is an AAL service type one, including the steps of:
    determining a first three-bit sequence count value for said first data cell;
    determining a second three-bit sequence count value for a second data cell if said AAL service type is not identified; and
    identifying said AAL service type as an AAL service type one if said second three bit sequence count value is one greater than said first three-bit sequence count value.

54. A system for identifying active channels in an asynchronous transfer mode (ATM) network having a plurality of channels including a signaling channel, comprising:
  a signaling engine, disposed to receive signals from said signaling channel for automatically monitoring the signaling channel, for identifying a first signal as a setup message associated with a first channel, for identifying a second signal as a connect message associated with said first channel, and for identifying said first channel as an active channel if said first signal is said setup message associated with said first channel and if said second signal is said connect message associated with said first channel;
  wherein said signaling engine identifies a third signal as a release message associated with said first channel, and for identifying said first channel as not an active channel if said first signal is said setup message associated with said first channel, said second signal is said connect message associated with said first channel, and said third signal is a release message associated with said first channel.

55. A system for identifying active channels in an asynchronous transfer mode (ATM) network having a plurality of channels including a signaling channel, comprising:
  a signaling engine, disposed to receive signals from said signaling channel for automatically monitoring the signaling channel, for identifying a first signal as a setup message associated with a first channel, for identifying a second signal as a connect message associated with said first channel, and for identifying said first channel as an active channel if said first signal is said setup message associated with said first channel and if said second signal is said connect message associated with said first channel; and
  an active channel detector, disposed to receive signals from said channels, for identifying a plurality of channels, for opening a first set of channels, and for monitoring a third signal on a first open channel of said first set of open channels to determine if said third signal includes a first data cell, and for identifying said first open channel as a first active channel if said third signal includes a data cell.

56. The system of claim 55, further comprising:
  an ATM application layer (AAL) type identifier, disposed to receive said first data cell from said first active channel, for identifying an AAL service type based upon the contents of said first data cell.

57. A system for identifying active channels in an asynchronous transfer mode (ATM) network having a plurality of channels including a signaling channel, comprising:
  a signaling engine, disposed to receive signals from said signaling channel for automatically monitoring the signaling channel, for identifying a first signal as a connect message associated with said first channel, and for identifying said first channel as an active channel if said first signal is said connect message associated with said first channel;
  wherein said signaling engine identifies a second signal as a release message associated with said first channel, and for identifying said first channel as not an active channel if said first signal is said connect message associated with said first channel and if said second signal is a release message associated with said first channel.

58. A system for identifying active channels in an asynchronous transfer mode (ATM) network having a plurality of channels including a signaling channel, comprising:

a signaling engine, disposed to receive signals from said signaling channel for automatically monitoring the signaling channel, for identifying a first signal as a connect message associated with said first channel, and for identifying said first channel as an active channel if said first signal is said connect message associated with said first channel; and an active channel detector, disposed to receive signals from said channels, for identifying a plurality of channels, for opening a first set of channels, and for monitoring a second signal on a first open channel of said first set of open channels to determine if said second signal includes a first data cell, and for identifying said first open channel as a first active channel if said second signal includes a data cell.

59. The system of claim 58, further comprising:

an ATM application layer (AAL) type identifier, disposed to receive said first data cell from said first active channel, for identifying an AAL service type based upon the contents of said first data cell.

* * * * *